(12) United States Patent
Alshin et al.

(10) Patent No.: US 9,736,499 B2
(45) Date of Patent: *Aug. 15, 2017

(54) METHOD AND APPARATUS FOR ENCODING VIDEO BY COMPENSATING FOR PIXEL VALUE ACCORDING TO PIXEL GROUPS, AND METHOD AND APPARATUS FOR DECODING VIDEO BY THE SAME

(71) Applicant: SAMSUNG ELECTRONICS CO., LTD., Suwon-si (KR)

(72) Inventors: Alexander Alshin, Suwon-si (KR); Elena Alshina, Suwon-si (KR); Nikolay Shlyakhov, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,584

(22) Filed: Jul. 17, 2015

(65) Prior Publication Data

US 2015/0326885 A1 Nov. 12, 2015

Related U.S. Application Data

(63) Continuation of application No. 14/627,042, filed on Feb. 20, 2015, now Pat. No. 9,118,914, which is a (Continued)

(30) Foreign Application Priority Data

Apr. 5, 2010 (KR) ........................ 10-2010-0031143

(51) Int. Cl.
*H04N 19/00* (2014.01)
*H04N 19/65* (2014.01)
(Continued)

(52) U.S. Cl.
CPC ........... *H04N 19/65* (2014.11); *G06K 9/4604* (2013.01); *H04N 19/117* (2014.11);
(Continued)

(58) Field of Classification Search
CPC .............................. H04N 19/44; H04N 19/46
(Continued)

(56) References Cited

U.S. PATENT DOCUMENTS 7,738,716 B2 6/2010 Song
7,961,793 B2 6/2011 Hagai et al.
(Continued)

FOREIGN PATENT DOCUMENTS

CA 2887783 A1 10/2011
CA 2887786 A1 10/2011
(Continued)

OTHER PUBLICATIONS

Communication dated Dec. 17, 2013 issued by the Federal Service for Intellectual Property in counterpart Russian Patent Application No. 2012146741.
(Continued)

*Primary Examiner* — Jeffery Williams
(74) *Attorney, Agent, or Firm* — Sughrue Mion, PLLC

(57) ABSTRACT

Provided are a method and apparatus of encoding a video by compensating for a pixel value and a method and apparatus of decoding a video by compensating for a pixel value. The method of encoding the video includes: encoding image data; decoding the encoded image data and generating a restored image by performing loop filtering on the decoded image data; determining a compensation value corresponding to errors between a predetermined group restored pixels in the restored image and corresponding original pixels, and a pixel group including a restored pixel to be compensated for by using the compensation value; and encoding the
(Continued)

compensation value and transmitting the encoded compensation value and a bitstream of the encoded image data.

3 Claims, 18 Drawing Sheets

Related U.S. Application Data continuation of application No. 13/080,066, filed on Apr. 5, 2011, now Pat. No. 8,982,962.

(51) Int. Cl.

| | | |
|---|---|---|
| *H04N 19/40* | (2014.01) | |
| *H04N 19/176* | (2014.01) | |
| *H04N 19/196* | (2014.01) | |
| *H04N 19/96* | (2014.01) | |
| *H04N 19/117* | (2014.01) | |
| *H04N 19/463* | (2014.01) | |
| *H04N 19/182* | (2014.01) | |
| *H04N 19/17* | (2014.01) | |
| *H04N 19/82* | (2014.01) | |
| *H04N 19/85* | (2014.01) | |
| *H04N 19/136* | (2014.01) | |
| *H04N 19/137* | (2014.01) | |
| *H04N 19/44* | (2014.01) | |
| *G06K 9/46* | (2006.01) | |

(52) U.S. Cl.
CPC ......... *H04N 19/136* (2014.11); *H04N 19/137* (2014.11); *H04N 19/17* (2014.11); *H04N 19/176* (2014.11); *H04N 19/182* (2014.11); *H04N 19/196* (2014.11); *H04N 19/40* (2014.11); *H04N 19/44* (2014.11); *H04N 19/463* (2014.11); *H04N 19/82* (2014.11); *H04N 19/85* (2014.11); *H04N 19/96* (2014.11)

(58) Field of Classification Search
USPC ............. 375/240.02, 375.24, 375.25, 375.29
See application file for complete search history.

(56) References Cited

U.S. PATENT DOCUMENTS

| | | | |
|---|---|---|---|
| 8,712,171 B2 | 4/2014 | Wittmann et al. | |
| 8,982,962 B2 * | 3/2015 | Alshin ................. | H04N 19/136 375/240.02 |
| 9,118,914 B2 * | 8/2015 | Alshin ................. | H04N 19/136 |
| 2005/0232497 A1 | 10/2005 | Yogeshwar et al. | |
| 2006/0013315 A1 | 1/2006 | Song | |
| 2007/0211797 A1 | 9/2007 | Kim et al. | |
| 2008/0240592 A1 | 10/2008 | Lee et al. | |
| 2010/0220784 A1 | 9/2010 | Tanimoto et al. | |
| 2010/0322303 A1 | 12/2010 | Wada et al. | |
| 2012/0177103 A1 * | 7/2012 | Fu ......................... | H04N 19/82 375/240.02 |
| 2014/0254674 A1 | 9/2014 | Lee et al. | |

FOREIGN PATENT DOCUMENTS

| | | |
|---|---|---|
| CA | 2887791 A1 | 10/2011 |
| CN | 1589016 A | 3/2005 |
| CN | 101401437 A | 4/2009 |
| CN | 101641961 A | 2/2010 |
| EP | 1 178 665 A2 | 2/2002 |
| EP | 2161936 A1 | 3/2010 |
| EP | 2249572 A1 | 11/2010 |
| KR | 10-2006-0121535 A | 11/2006 |
| KR | 10-0845067 A | 7/2008 |
| KR | 10-2009-0003272 A | 1/2009 |
| KR | 10-2009-0037031 A | 4/2009 |
| RU | 2005110996 A | 10/2006 |
| RU | 2384971 C1 | 3/2010 |
| WO | 2008/088140 A1 | 7/2008 |
| WO | 2009/089032 A2 | 7/2009 |
| WO | 2009110160 A1 | 9/2009 |
| WO | 2010034206 A1 | 4/2010 |
| WO | 2011/126273 A3 | 10/2011 |
| WO | 2013/068428 A2 | 5/2013 |
| WO | 2013/068433 A2 | 5/2013 |

OTHER PUBLICATIONS

Communication dated Jul. 5, 2013 issued by the European Patent Office in counterpart European Patent Application No. 11766124.9.
Communication dated Mar. 13, 2015 issued by the Korean Intellectual Property Office in counterpart Korean Patent Application No. 10-2010-0031143.
Communication dated May 6, 2015 issued by the State Intellectual Property Office of the People's Republic of China in counterpart Chinese Patent Application No. 201180027828.0.
Communication dated Nov. 24, 2011 issued by the International Searching Authority in counterpart International Patent Application No. PCT/KR2011/002373.
Communication dated Sep. 20, 2013 issued by the Australian Patent Office in counterpart Australian Patent Application No. 2011239128.
Ken McCann et al.; "Samsung's Response to the Call for Proposals on Video Compression Technology"; Joint Collaborative Team on Video Coding (JCT-VC) of ITU-T SG16 WP3 and ISO/IEC JTC1/SC29/WG11; Apr. 15-23, 2010; pp. 1-42.
Yu Liu et al., "Unified Loop Filter for Video Coding", Hong Kong ASTRI, Jan. 16, 2010, 9 pages total.
Decision of Grant, dated Jan. 22, 2015, in Russian Application No. 2012146741.
Yu-Wen Huang et al., "In-Loop Adaptive Restoration", Joint Collaborative Team On Video Coding (JCT-VC) of ITU-T SG16 WP3 and ISO/IEC JTC1/SC29/WG11, 2nd Meeting: Geneva, CH, Jul. 2010. Document: JCTVC-B077 (11 Pages Total) XP030007657.
Communication dated Feb. 5, 2016, from the European Patent Office in counterpart European Application No. 15191859.6.
Communication dated Jan. 21, 2016, from the European Patent Office in counterpart European Application No. 11766124.9.
Communication dated Jan. 28, 2016, from the European Patent Office in counterpart European Application No. 15191912.3.
Communication dated Jan. 8, 2016, from the European Patent Office in counterpart European Application No. 15191912.3.
Communication dated Jan. 28, 2016, from the European Patent Office in counterpart European Application No. 15191963.6.
Communication dated Jan. 11, 2016, from the European Patent Office in counterpart European Application No. 15191967.7.
Communication dated Jan. 8, 2016, from the European Patent Office in counterpart European Application No. 15191963.6.
Communication dated Dec. 14, 2015, issued by the Korean Intellectual Property Office in corresponding Korean Application No. 10-2015-0034529.
Communication dated Dec. 14, 2015, issued by the Korean Intellectual Property Office in corresponding Korean Application No. 10-2015-0034530.
Communication dated Nov. 23, 2015 from the Russian Patent Office in counterpart application No. 2015118706/08.
Communication dated Nov. 23, 2015 from the Russian Patent Office in counterpart application No. 2015118705/08.
Communication dated Aug. 22, 2015 issued by Korean Intellectual Property Office in counterpart Korean Patent Application No. 10-2015-0034530.
Communication issued Jul. 14, 2016, issued by the Canadian Intellectual Property Office in counterpart Canadian Patent Application No. 2887786.
Communication issued Jul. 27, 2016, issued by the Canadian Intellectual Property Office in counterpart Canadian Patent Application No. 2887748.

* cited by examiner

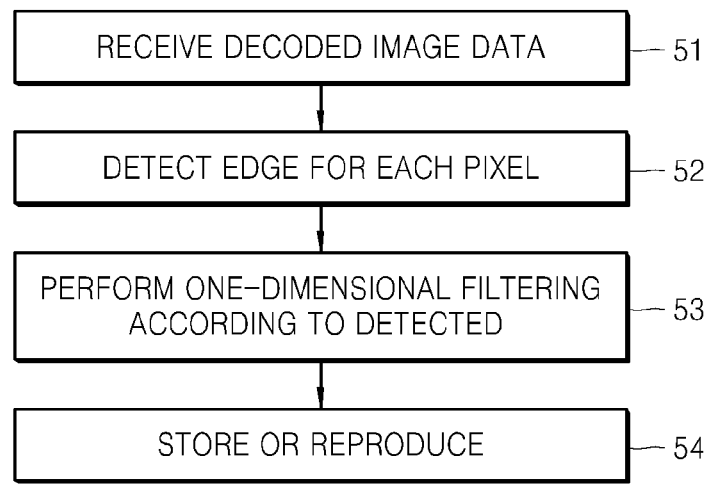
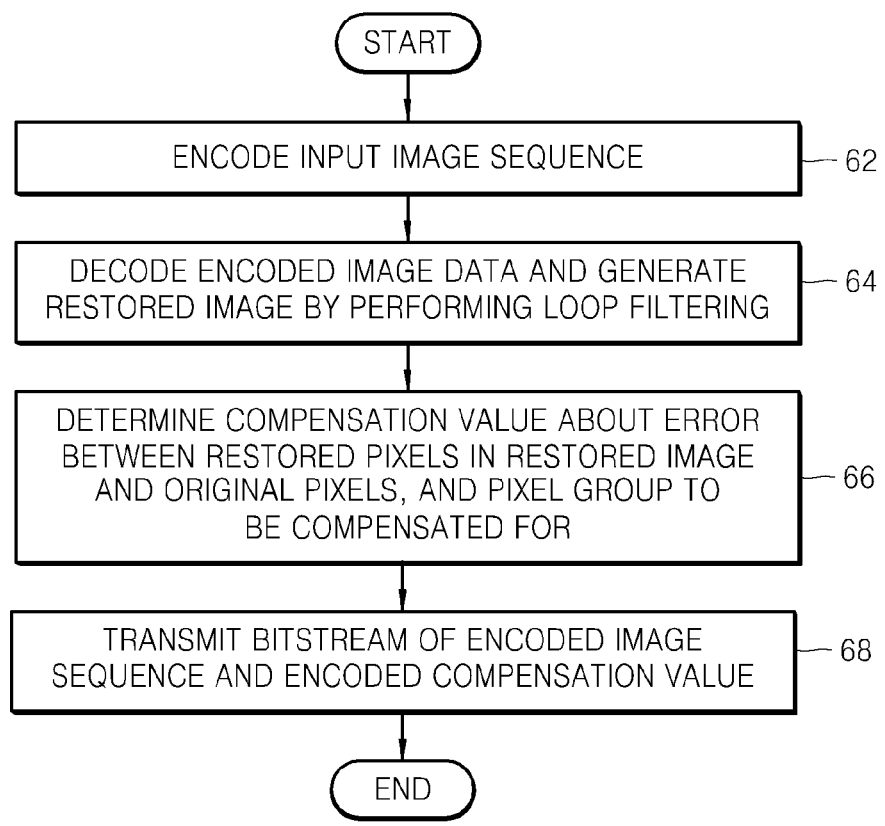

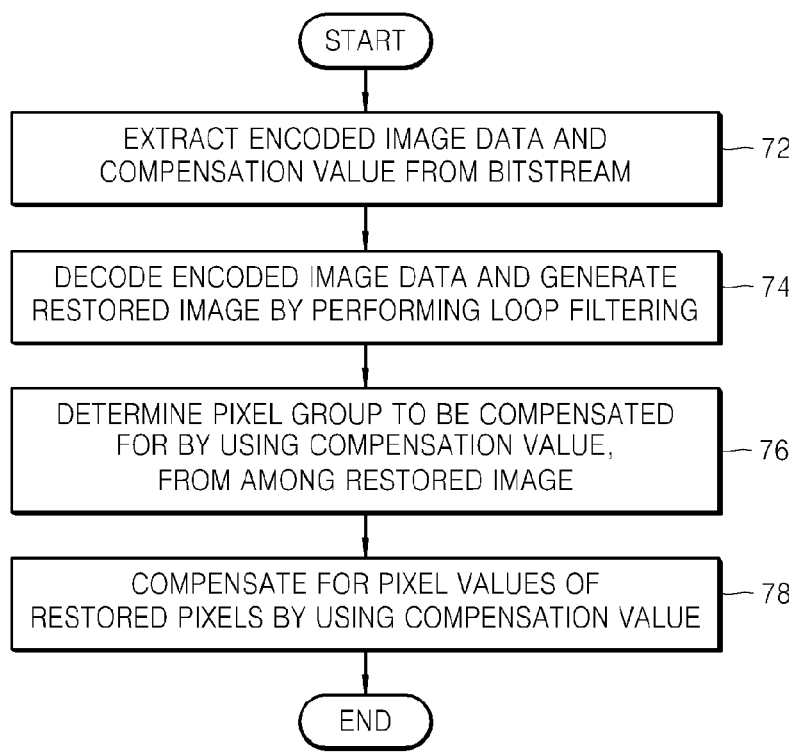
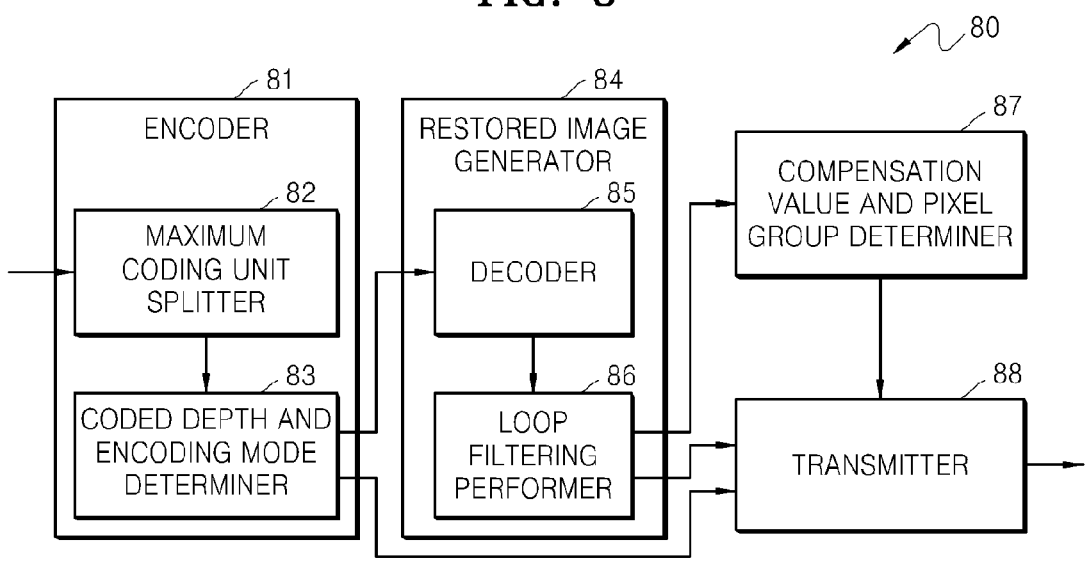

FIG. 14
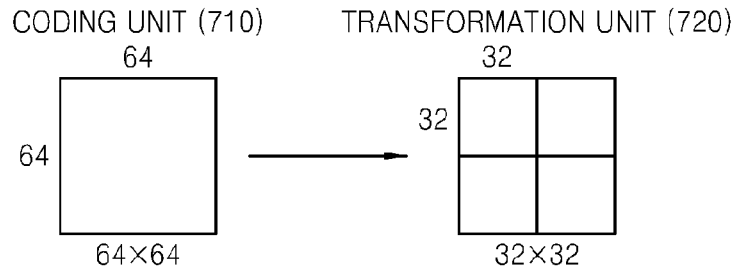
FIG. 15
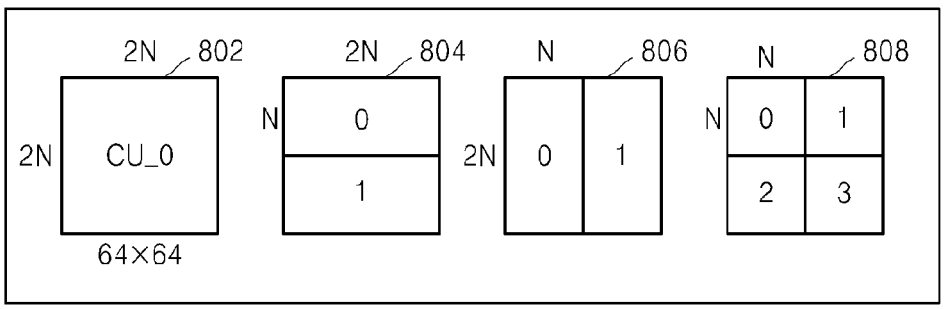
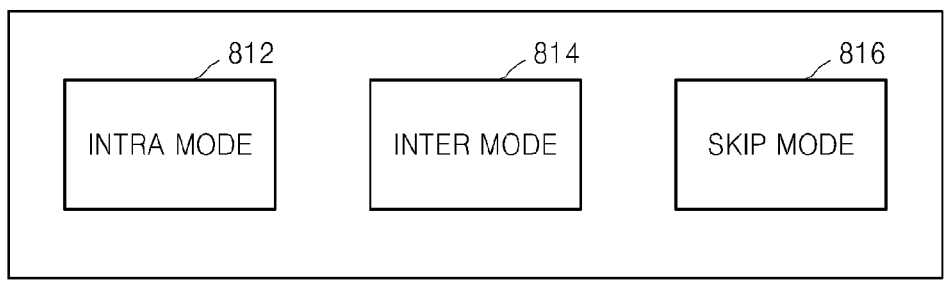
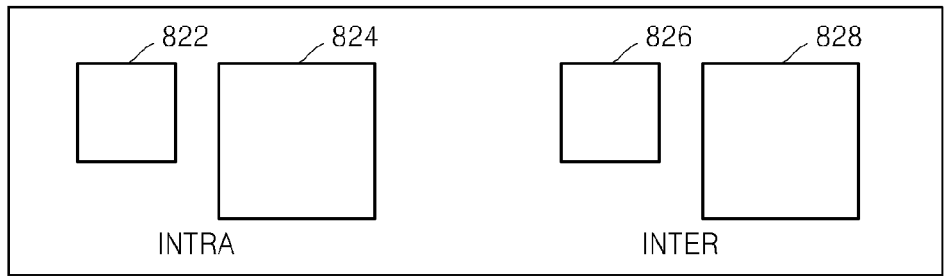

CODING UNITS (1010)

METHOD AND APPARATUS FOR ENCODING VIDEO BY COMPENSATING FOR PIXEL VALUE ACCORDING TO PIXEL GROUPS, AND METHOD AND APPARATUS FOR DECODING VIDEO BY THE SAME

CROSS-REFERENCE TO RELATED PATENT APPLICATIONS

This application is a Continuation application of U.S. application Ser. No. 14/627,042 filed Feb. 20, 2015, which is a Continuation application of U.S. application Ser. No. 13/080,066 filed Apr. 5, 2011 and issued as U.S. Pat. No. 8,982,962 on Mar. 17, 2015, which claims priority from Korean Patent Application No. 10-2010-0031143, filed on Apr. 5, 2010 in the Korean Intellectual Property Office, the disclosures of which are incorporated herein in their entireties by reference.

BACKGROUND

1. Field

Apparatuses and methods consistent with exemplary embodiments relate to encoding and decoding a video.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size.

The quality of an image may be distorted due to encoding and decoding of a video, and a post-processing module may be added to a decoder or a restored image so as to improve the quality of the restored image.

SUMMARY

One or more exemplary embodiments provide a method and apparatus for encoding video, and a method and apparatus for decoding video, for compensating for a pixel value of a predetermined pixel group.

According to an aspect of an exemplary embodiment, there is provided a method of encoding a video for compensating for a pixel value, the method including: encoding image data; decoding the encoded image data and generating a restored image by performing loop filtering on the decoded image data; determining a compensation value corresponding to errors between a predetermined group of restored pixels in the restored image and corresponding original pixels, and a pixel group including a restored pixel to be compensated for by using the compensation value; and encoding the compensation value and transmitting the encoded compensation value and a bitstream of the encoded image data.

The determining the compensation value and the pixel group may include: determining an extreme value level indicating a degree of closeness to a maximum value or a minimum value according to restored pixels by comparing pixel values of neighboring restored pixels in the restored image; and determining the pixel group comprising the restored pixel to be compensated for among the neighboring restored pixels based on the determined extreme value level according to restored pixels.

The determining the pixel group based on the extreme value level may include classifying the neighboring restored pixels into pixel groups including restored pixels having a same extreme value level based on the determined extreme value level according to restored pixels, and determining a pixel group of at least one extreme value level as the pixel group including the restored pixel to be compensated for, and the determining the compensation value and the pixel group may further include determining the compensation value for the determined pixel group of the at least one extreme value level.

The determining the compensation value and the pixel group may include: classifying restored pixels of the restored image into pixel groups including restored pixels in a same band, according to bands, obtained by dividing a total section of pixel values; and determining the compensation value according to the pixel groups according to bands.

The classifying the restored pixels according to bands may include classifying the restored pixels into the pixel groups according to bands, based on bands obtained by dividing the total section of the pixel values into a number of 2 to the power of a positive integer.

An index of the number of 2 to the power of the positive integer may be determined based on a number of most significant bits in a bit depth of the restored pixels.

The total section of the pixel values may be within a range of an extended bit depth.

The determining the compensation value and the pixel group may include: classifying restored pixels of the restored image into pixel groups including restored pixels disposed on a same line, according to lines; and determining the compensation value according to the pixel groups according to lines.

The classifying the restored pixels into the pixel groups according to lines may include detecting restored pixels forming lines in at least one of a horizontal direction, a vertical direction, a diagonal direction, a curved direction and a boundary direction of a predetermined object, from among the restored pixels of the restored image.

The determining the compensation value and the pixel group may include determining the compensation value by using an average value of errors between restored pixels of the pixel group and corresponding original pixels.

The determining the compensation value and the restored pixel may include determining the compensation value for all restored pixels to be compensated for, or individually determining the compensation value according to predetermined groups of the restored pixels to be compensated for.

The generating the restored image may be performed by using adaptive loop filtering using a plurality of continuous one-dimensional filters.

The determining the compensation value and the pixel group may include determining the compensation value and the restored pixel to be compensated for according to at least one data unit from among an image sequence, a slice, a frame, and a coding unit of the input video.

The transmitting the bitstream may include inserting and transmitting the encoded compensation value into a slice header.

The encoding the input image sequence may include: dividing a picture into a maximum coding unit; performing encoding on at least one deeper coding unit according to depth, according to regions split by hierarchically dividing the maximum coding unit as the depth deepens to determine an encoding mode of a coding unit of a coded depth, the encoding mode including information of at least one coded depth that generates a least encoding error; and outputting the encoded image data according to the determined coded depth and encoding mode.

According to an aspect of another exemplary embodiment, there is provided a method of decoding a video for compensating for a pixel value, the method including: extracting encoded image data and a compensation value from a bitstream by parsing the bitstream of an encoded image; decoding the extracted image data and generating a restored image by performing loop filtering on the decoded image data; determining a pixel group including a restored pixel to be compensated for from among restored pixels of the restored image, by using the extracted compensation value; and compensating for an error between the restored pixel of the determined pixel group and a corresponding original pixel by using the extracted compensation value.

The determining the pixel group may include: determining an extreme value level, which indicates a degree of closeness to a maximum value or a minimum value according to the restored pixels by comparing pixel values of neighboring restored pixels in the restored image; and determining the pixel group comprising the restored pixel to be compensated for among the neighboring restored pixels based on the determined extreme value level.

The determining the extreme value level may include classifying the neighboring restored pixels into pixel groups including restored pixels having a same extreme value level based on the determined extreme value level, and determining a pixel group of at least one extreme value level as the pixel group including the restored pixel to be compensated for.

The determining the pixel group may include classifying the restored pixels of the restored image into pixel groups according to bands.

The compensating for the error may include compensating for errors of pixel values of the restored pixels of the pixel groups according to extreme value levels by using the compensation values according to extreme value levels for compensating for the pixel values of the pixel groups according to the extreme value levels.

The determining the pixel group may include classifying the restored pixels of the restored image into pixel groups including restored pixels disposed on a same line, according to lines, and determining a pixel group, from among the pixel groups according to lines, as the pixel group comprising the restored pixel to be compensated for.

The compensating for the error may include compensating for pixel values of the restored pixels in the pixel groups according to lines, by using compensation values of the pixel groups according to lines for compensating for the pixel values of the pixel groups according to lines.

The classifying the restored pixels into the pixel groups according to lines may include detecting restored pixels forming lines in at least one of a horizontal direction, a vertical direction, a diagonal direction, a curved direction and a boundary direction of a predetermined object, from among the restored pixels of the restored image.

The compensation value may be determined by using an average value of errors between the restored pixels of the pixel group and corresponding original pixels during encoding of the encoded image data.

The compensating for the error may include compensating for all restored pixels to be compensated for by using the compensation value.

The compensating for the error may include compensating for the pixel values of the restored pixels by using compensation values individually determined according to predetermined groups of the restored pixels to be compensated for.

The generating the restored image may be performed by using adaptive loop filtering using a plurality of continuous one-dimensional filters.

The encoded image data may be encoded by dividing a picture into a maximum coding unit, and performing encoding on at least one deeper coding unit according to depth, according to regions split by hierarchically dividing the maximum coding unit as the depth deepens to determine information of an encoding mode of a coding unit of a coded depth, which includes information about at least one coded depth that generates a least encoding error, from the bitstream, and the generating the restored image may include decoding the image data encoded based on the coded depth and the encoding mode, based on the information about the encoding mode, and performing the loop filtering.

According to an aspect of another exemplary embodiment, there is provided an apparatus for encoding a video for compensating for a pixel value, the apparatus including: an encoder which encodes image data; a restored image generator which decodes the encoded image data and generates a restored image by performing loop filtering on the decoded image data; a compensation value and pixel group determiner which determines a compensation value corresponding to errors between a predetermined group of restored pixels and corresponding original pixels, and a pixel group including a restored pixel to be compensated for by using the compensation value; and a transmitter which encodes the compensation value and transmits the encoded compensation value and a bitstream of the encoded image data.

According to an aspect of another exemplary embodiment, there is provided an apparatus for decoding a video for compensating for a pixel value, the apparatus including: an extractor which extracts encoded image data and a compensation value from a bitstream by parsing the bitstream of an encoded image; a restored image generator which decodes the extracted image data and generates a restored image by performing loop filtering on the decoded image data; a pixel group determiner which determines a pixel group including a restored pixel to be compensated for from among restored pixels of the restored image, by using the extracted compensation value; and a restored pixel compensator which compensates for an error between the restored pixel of the determined pixel group and a corresponding original pixel by using the extracted compensation value.

According to an aspect of another exemplary embodiment, there is provided a computer readable recording medium having recorded thereon a program for executing any one of the above-described methods.

BRIEF DESCRIPTION OF THE DRAWINGS

The above and/or other aspects will become more apparent by describing in detail exemplary embodiments with reference to the attached drawings in which:

FIG. 5 is a flowchart for describing adaptive loop filtering according to another exemplary embodiment;

FIG. 6 is a flowchart illustrating a method of encoding a video for compensating for a pixel value, according to an exemplary embodiment;

FIG. 7 is a flowchart illustrating a method of decoding a video by compensating for a pixel value, according to an exemplary embodiment;

FIG. 8 is a block diagram of an apparatus for encoding a video by compensating for a pixel value after performing loop filtering based on coding units having a tree structure, according to an exemplary embodiment;

FIG. 14 is a diagram for describing a relationship between a coding unit and transformation units, according to an exemplary embodiment;

FIG. 15 is a diagram for describing encoding information of coding units corresponding to a coded depth, according to an exemplary embodiment;

DETAILED DESCRIPTION OF EXEMPLARY EMBODIMENTS

Hereinafter, exemplary embodiments will be described more fully with reference to the accompanying drawings. Expressions such as "at least one of," when preceding a list of elements, modify the entire list of elements and do not modify the individual elements of the list.

A method and apparatus for encoding a video, and a method and apparatus for decoding a video, by compensating for errors of pixel values of a predetermined pixel group, according to exemplary embodiments will now be described with reference to FIGS. 1 through 22. In detail, encoding and decoding a video by compensating for a pixel value after performing loop filtering, according to exemplary embodiments will be described with reference to FIGS. 1 through 7, and encoding and decoding a video for compensating for a pixel value after performing loop filtering based on coding units having a tree structure, according to exemplary embodiments will be described with reference to FIGS. 8 through 22.

Hereinafter, encoding and decoding of a video by compensating a pixel value after performing loop filtering according to exemplary embodiments will be described with reference to FIGS. 1 through 7.

Figure 1:
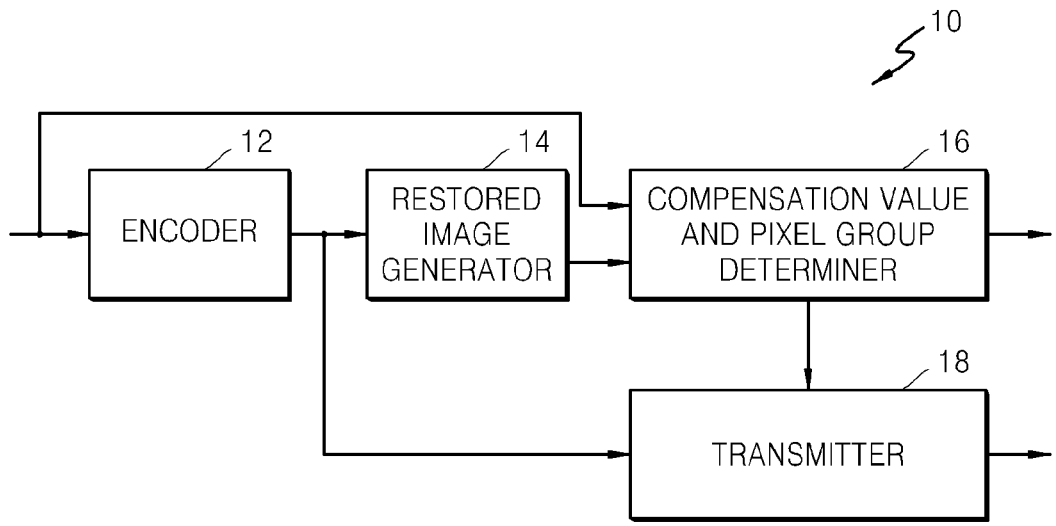
FIG. 1 is a block diagram of an apparatus for encoding a video for compensating for a pixel value, according to an exemplary embodiment.

FIG. 1 is a block diagram of a video encoding apparatus 10 for compensating for a pixel value, according to an exemplary embodiment.

The video encoding apparatus includes an encoder 12, a restored image generator 14, a compensation value and pixel group determiner 16, and a transmitter 18. The operations of the encoder 12, the restored image generator 14, and the compensation value and pixel group determiner 16 of the video encoding apparatus 10 may be organically controlled by a video encoding processor, a central processor, a graphic processor, or the like.

The encoder 12 encodes an image in a picture unit from among a sequence of input images. The encoder may generate encoded image data by performing motion estimation, inter prediction, intra prediction, transformation, and quantization on an input image.

The encoder 12 may use any video encoding method, such as MPEG 1, 2, 4, and H.26x. For example, the encoder 12 may use a method of video encoding based on coding units having a tree structure, according to an exemplary embodiment, which will be described later with reference to FIGS. 8 through 22.

The restored image generator 14 may receive the image data encoded by the encoder 12, and generate a restored image by decoding the encoded image data and performing loop filtering on the decoded image data.

The restored image generator 14 may generate the decoded image data by performing inverse quantization, inverse transformation, inter prediction, motion compensation, and intra prediction on the encoded image data.

The decoding performed on the encoded image data by the restored image generator 14 may be performed as inverse processes of a video encoding method performed by the encoder 12. For example, the video encoding apparatus 10 when the encoder 12 and the restored image generator 14 performs the method of encoding a video, according to an exemplary embodiment, will be described later with reference to FIGS. 8 through 22.

The restored image generator 14 may perform in-loop filtering on the decoded image data. The in-loop filtering may selectively include deblocking filtering and adaptive loop filtering. The adaptive loop filtering may be performed by using a plurality of continuous one-dimensional filters. The adaptive loop filtering according to exemplary embodiments will be described in detail later with reference to FIGS. 4 and 5.

The compensation value and pixel group determiner 16 receives the input image and the restored image output by the restored image generator 14, determines a compensation value about an error between each restored pixel of a predetermined group in the restored image, and a corresponding original pixel in the input image, and determines a pixel group including restored pixels to be compensated for by using the compensation value.

The compensation value and pixel group determiner 16 compares pixel values of neighboring restored pixels from among the restored pixels in the restored image, and determines an extreme and/or edge value level indicating a closeness to a maximum value and a minimum value. Hereinafter, for convenience of explanation, an 'extreme and/or edge value level' may represent at least one of an edge value level and an edge value level. The compensation value and pixel group determiner 16 may determine the neighboring restored pixels into pixel groups including restored pixels having the same extreme and/or edge value level, based on each extreme and/or edge value level of the neighboring restored pixels.

The compensation value and pixel group determiner 16 may determine at least one pixel group of extreme and/or edge value level from among the classified pixel groups as a pixel group having pixel values to be compensated for. The compensation value and pixel group 16 may determine to compensate for pixel values of pixel groups of minimum and maximum extreme and/or edge value levels, or pixel values of pixel groups of extreme and/or edge value levels in a predetermined range. A method of determining a target to be compensated for based on extreme and/or edge value levels of neighboring restored pixels will be described later with reference to FIG. 3.

The compensation value and pixel group determiner 16 may determine to compensate for pixel values of pixel groups according to bands. The compensation value and pixel group determiner 16 may split a total range of pixel values of the restored pixels into a plurality of split bands so as to assign pixel groups of the restored pixels. The compensation value and pixel group determiner 16 may classify restored pixels in the same band into pixel groups according to bands, based on the pixel values of the restored pixels. Here, all pixel values of the restored pixels in the pixel group according to bands may be determined to be compensated for, and the compensation value and pixel group determiner 16 may separately determine a compensation value for each pixel group according to bands.

For high-speed processing, the total range of the pixel values may be split into a number of bands identical to a number of 2 to the power of a positive integer. For high-speed processing, when a number of most significant bits in a bit depth of a bit string of the restored pixels is p, the total range of the pixel values may be split into a number of bands identical to a number of $2^p$. Alternatively, the total range of the pixel values may be identical to a range of extended bit depth of the restored pixel.

The compensation value and pixel group determiner 16 may analyze the restored image, detect lines in a predetermined direction, and classify the restored pixels into pixel groups according to lines including restored pixels on the same line. When lines in various directions, such as a horizontal direction, a vertical direction, a diagonal direction, a curved direction and a boundary direction of a predetermined object, are detected, pixels forming each line may be classified into one pixel group. The compensation value and pixel group determiner 16 may individually determine a compensation value for each pixel group according to lines.

The compensation value and pixel group determiner 16 may determine an average value of errors between the restored pixels to be compensated for and corresponding original pixels as the compensation value. The error between the restored pixel and the original pixel may include a difference between the restored pixel and the original pixel, an absolute value of the difference, or a square of the difference. The compensation value and pixel group determiner 16 may determine one compensation value to be equally applied to the entire restored pixels to be compensated for, or individually determine a compensation value according to pixel groups classified according to characteristics.

The compensation value and pixel group determiner 16 may determine the restored pixel to be compensated for and determine a corresponding compensation value, according to at least one data unit from among an image sequence, a slice, a frame, and a coding unit of the input video.

The transmitter 18 receives and encodes the compensation value determined by the compensation value and pixel group determiner 16. The transmitter 18 receives the image data encoded by the encoder 12, and generates and outputs a bitstream including the encoded compensation value and the encoded image data. The encoded image data may be converted into a bitstream format via entropy encoding, and inserted into a bitstream for transmission.

The transmitter 18 may receive additional information about a method of determining a pixel group from the compensation value and pixel group determiner, and encode and insert the additional information into the bitstream. Since the method may be based on the extreme and/or edge value levels, bands, or lines as described above, information indicating how the compensation value is employed and a pixel group using the compensation value may be transmitted.

When the restored image generator 14 performs the adaptive loop filtering, the transmitter 18 may receive information about a loop filter coefficient for the adaptive loop filtering, and encode and insert the information into the bitstream. The video encoding apparatus 10 may split the image to parts of a square shape, a rectangular shape or even irregular shape and perform selective correction for only specific groups of pixels in concrete region. Based on the split parts of the image, pixel values may be compensated adaptively to the contents of the image. Also, the video encoding apparatus 10 may transmit information regarding groups of pixels to be corrected by explicit signaling and implicit signaling.

The video encoding apparatus 10 may provide the information about the compensation value obtained during encoding to a decoder so that the decoder is able to support a post-process that may be performed to reduce an error between the restored image and the original image. Also, since the compensation value is determined according to the pixel groups, an amount of transmission bits may be reduced by only encoding and transmitting the information about the compensation value, without having to encode and transmit information about a location of individual pixels.

Figure 2:
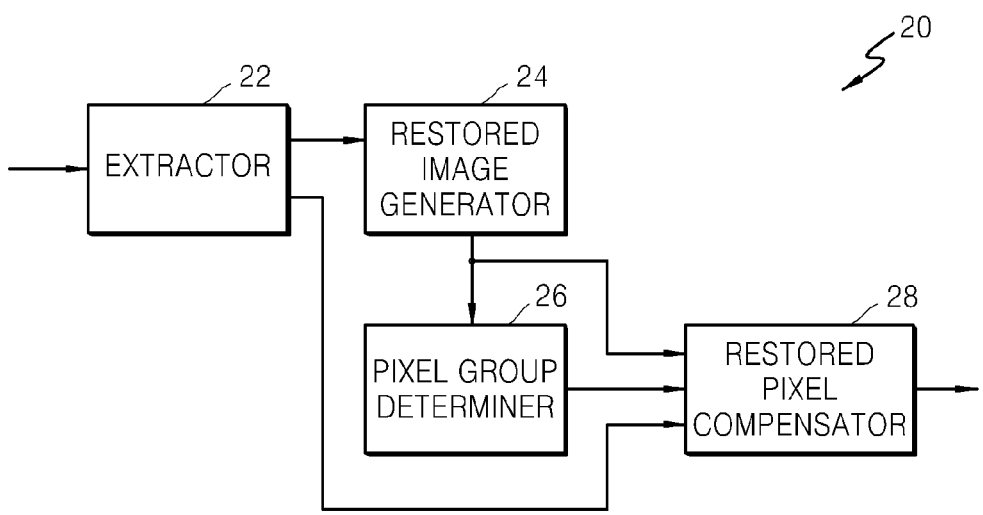
FIG. 2 is a block diagram of an apparatus for decoding a video for compensating for a pixel value, according to an exemplary embodiment.

FIG. 2 is a block diagram of a video decoding apparatus 20 for compensating for a pixel value, according to an exemplary embodiment.

The video decoding apparatus 20 includes an extractor 22, a restored image generator 24, a pixel group determiner 26, and a restored pixel compensator 28. The operations of the extractor 22, the restored image generator 24, the pixel group determiner 26 and the restored pixel compensator 28 of the video decoding apparatus 20 may be organically controlled by a video decoding processor, a central processor, a graphic processor, or the like.

The extractor 22 receives and parses a bitstream about an encoded image, and extracts encoded image data and information related to a compensation value from the bitstream. The information related to the compensation value may include information about the compensation value. When the information related to the compensation value further includes information about a method of determining a pixel group to be compensated for by using the compensation value, the extractor 22 may extract the compensation value and the information about the method from the bitstream. The extractor 22 may extract at least one of the compensation value and the information related to the compensation value according to at least one data unit from among an image sequence, a slice, a frame, and a coding unit of an input video.

The extractor 22 may extract encoding information, such as an encoding method and an encoding mode, which is used to decode the encoded image data. When information about a loop filter coefficient for adaptive loop filtering is inserted into the bitstream, the extractor 22 may extract the information about the loop filter coefficient from the bitstream.

The restored image generator 24 receives the encoded image data, the encoding information, and the information about the loop filter coefficient, which are extracted by the extractor 22, and generates a restored image by decoding the encoded image data and performing loop filtering on the decoded image data.

The decoding of the encoded image data may be performed as inverse processes of a method of video encoding performed on the encoded image data. For example, when the encoded image data is encoded and transmitted according to a method of video encoding based on coding units having a tree structure, according to an exemplary embodiment, the restored image generator 24 may decode the encoded image data according to a method of video decoding based on coding units having a tree structure.

The restored image generator 24 may selectively perform in-loop filtering, such as deblocking filtering and adaptive loop filtering, on the decoded image data. The adaptive loop filtering may be performed by using a plurality of continuous one-dimensional filters.

The pixel group determiner 26 may receive the restored image generated by the restored image generator 24, and the information related to the compensation value extracted by the extractor 22, and determine a pixel group including restored pixels to be compensated for by using the compensation value, from among restored pixels of a predetermined group in the restored image. The restored pixel compensator 28 receives the compensation value extracted by the extractor 22, and the information about the pixel group determined by the pixel group determiner 26, and compensates for the pixel values of the restored pixels by using the compensation value and outputs the restored image having the restored pixel values.

When the information about the method of determining the pixel group is extracted by the extractor 22, the pixel group determiner 26 may determine the pixel group having the pixel values to be compensated for by using the method. For example, the pixel group determiner 26 may determine whether to classify the restored pixels according to extreme and/or edge value levels, bands of pixel values, or lines, and determine the pixel group based on the method.

The pixel group determiner 26 may determine an extreme and/or edge value level according to restored pixels by comparing pixel values of neighboring restored pixels in the restored image. The pixel group determiner 26 may classify the neighboring restored pixels based on the extreme and/or edge value levels, and determine a pixel group including the restored pixels of at least one predetermined extreme and/or edge value level as a pixel group including restored pixels having pixel values to be compensated for by using the compensation value. The restored pixel compensator 28 may compensate the pixel values of the restored pixels in the determined pixel group, by using the compensation value.

Alternatively, the pixel group determiner 26 may classify the restored pixels in the restored image into pixel groups according to bands, based on bands obtained by splitting a total section of the pixel values. The restored pixel compensator 28 may compensate for the pixel values of the restored pixels in the pixel group according to bands, by using a compensation value according to bands for the restored pixels in the pixel group according to bands.

The total section of the pixel values may be split into a number of bands equal to a number of 2 to the power of a positive integer. Here, an index of the number of 2 to the power of a positive integer may be determined based on a number of most significant bits in a bit depth of the restored pixels. Also, the total section of the pixel values may be a range of extended bit depth of the restored pixels.

The pixel group determiner 26 may classify the restored pixels of the restored image into pixel groups according to lines. The restored pixel compensator 28 may compensate for pixel values of the restored pixels in the pixel group according to lines, by using a compensation value for the pixel group according to lines. The pixel group determiner 26 may detect restored pixels forming lines in at least one horizontal direction, a vertical direction, a diagonal direction, a curved direction or a boundary direction of a predetermined object, from among the restored pixels of the restored image.

The compensation value may be determined and transmitted by using an average value of errors between the restored pixels and corresponding original pixels during encoding. The restored pixel compensator 28 may compensate for all pixel values of the restored pixels to be compensated for by using one compensation value. Alternatively, when the compensation value extracted by the extractor 22 is set according to pixel groups, the restored pixel compensator 28 may compensate for the pixel values by using the compensation value individually determined according to the pixel groups.

The video encoding apparatus 10 and the video decoding apparatus 20 may compensate for a systematic error generated between a restored image and an original image when an encoded image is decoded and restored. The video encoding apparatus 10 may transmit information regarding groups of pixels to be corrected by explicit signaling and implicit signaling. The video encoding apparatus 10 and the video decoding apparatus 20 may split the image to parts of a square shape, a rectangular shape or even irregular shape and perform selective correction for only specific groups of pixels in concrete region. Based on the split parts of the image, pixel values may be compensated adaptively to the contents of the image.

As an example of the systematic error between the restored image and the original image, the average value of the errors of pixel values between restored pixels in a predetermined group and corresponding original pixels may not be 0. Accordingly, the video encoding apparatus 10 and the video decoding apparatus 20 compensates for the error between the restored pixel and the original pixel.

The compensation value and pixel group determiner 16 may determine a compensation value according to Equation 1 below.

$$\text{corr} = \frac{\sum_{m=1}^{M} (Org(x_m, y_m) - Rec(x_m, y_m))}{M}. \quad \text{Equation 1}$$

Here, m denotes an integer from 1 to M, and an average value of errors between pixel values $Org(x_m, y_m)$ of an original pixel and pixel values $Rec(x_m, y_m)$ of a restored pixel may be used as a compensation value of pixel groups $\{(x_m, y_m)\}$ including pixels at locations $(x_m, y_m)$.

The restored pixel compensator 28 may compensate for pixel values of restored pixels in a pixel group according to Equation 2 below.

$$Rec_{corrected}(x_m, y_m) = Rec(x_m, y_m) + \text{corr.} \quad \text{Equation 2}$$

The restored pixel compensator 28 may compensate for the pixel values $Rec(x_m, y_m)$ of the restored pixel by using the compensation value corr, and output pixel values $Rec_{corrected}(x_m, y_m)$ according to pixels as results of compensating for the pixel values $Rec(x_m, y_m)$ in the pixel groups $\{(x_m, y_m)\}$.

The video encoding apparatus 10 and the video decoding apparatus 20 may classify the restored pixels according to a predetermined standard, so as to determine the pixel groups having the pixel values to be compensated for.

The pixel groups may be classified according to extreme and/or edge value levels, according to an exemplary embodiment. A local extreme and/or edge value includes a local minimum value and a local maximum value. A local minimum value $f(x_{min}, y_{min})$ and a local maximum value $f(x_{max}, y_{max})$ at a neighboring coordinate $(x,y)$ in a predetermined range $\epsilon$ are respectively defined in Equations 3 and 4 below, with respect to a quadratic function $f(x,y)$.

$$f(x,y) \geq f(x_{min}, y_{min}), \text{ if } |x_{min}-x|+|y_{min}-y| \leq \epsilon \text{ and } \epsilon > 0.$$

$$f(x,y) \leq f(x_{max}, y_{max}), \text{ if } |x_{max}-x|+|y_{max}-y| \leq \epsilon \text{ (wherein, } \epsilon > 0\text{).} \quad \text{Equation 4}$$

Also, the local minimum value $f(x_{min}, y_{min})$ and the local maximum value $f(x_{max}, y_{max})$ may be respectively defined in Equations 5 and 6 below, with respect to a discrete signal pixel $(x,y)$.

$$f(x_{min}, y_{min}) \leq f(x_{min}+1, y_{min})$$

$$f(x_{min}, y_{min}) \leq f(x_{min}-1, y_{min})$$

$$f(x_{min}, y_{min}) \leq f(x_{min}, y_{min}+1)$$

$$f(x_{min}, y_{min}) \leq f(x_{min}, y_{min}-1). \quad \text{Equation 5}$$

$$f(x_{max}, y_{max}) \geq f(x_{max}+1, y_{max})$$

$$f(x_{max}, y_{max}) \geq f(x_{max}-1, y_{max})$$

$$f(x_{max}, y_{max}) \geq f(x_{max}, y_{max}+1)$$

$$f(x_{max}, y_{max}) \geq f(x_{max}, y_{max}-1). \quad \text{Equation 6}$$

The video encoding apparatus 10 and the video decoding apparatus 20 may determine pixels corresponding to the extreme and/or edge value from among predetermined neighboring restored pixels on horizontal and vertical lines, according to Equations 5 and 6. Also, the More neighbor pixels, including, for example, pixels $(x_{max}+1, y_{max}+1)$, $(x_{max}-1, y_{max}+1)$, $(x_{max}+1, y_{max}-1)$ and $(x_{max}-1, y_{max}-1)$ on diagonal lines, may be included to pixel classification process. Predetermined pixels may be excluded from pixel groups. For example, if only pixels on the same line may be classified into a pixel group, other pixels away from the corresponding line may be excluded from the pixel group.

A planarization phenomenon may be generated by a general video encoding and decoding system. Accordingly, a local minimum value in a restored image is higher than a pixel value of an original image, and an error between local minimum values of the restored image and the original image is a positive value. Also, a local maximum value in the restored image is lower than a pixel value of the original image, and an error between local maximum values of the restored image and the original image is a negative value.

Accordingly, the video encoding apparatus 10 and the video decoding apparatus 20 may determine average values of errors of local minimum values and local maximum values of a predetermined pixel group between a restored image and an original image, and compensate for pixel values of restored pixels in the predetermined pixel group. Hereinafter, a method of determining an extreme and/or edge value level of restored pixels of a predetermined pixel group, which is performed by the compensation value and pixel group determiner 16 of the video encoding apparatus 10, and the pixel group determiner 26 of the video decoding apparatus 20, will be described with reference to FIG. 3.

Figure 3:
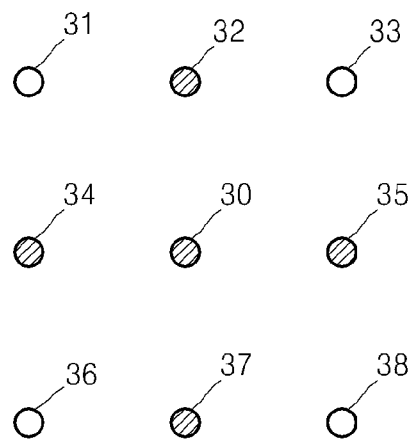
FIG. 3 illustrates neighboring restored pixels to be compared to a restored pixel so as to determine an extreme value level of the restored pixel, according to an exemplary embodiment.

FIG. 3 illustrates neighboring restored pixels 32, 34, 35, and 37 to be compared to a current restored pixel 30 so as to determine an extreme and/or edge value level of the current restored pixel 30, according to an exemplary embodiment. For the convenience of explanation, FIG. 3 illustrates only neighboring restored pixels 32, 34, 35, and 37. However, pixels compared to the current restored pixel 30 according to an exemplary embodiment do not limited to neighboring restored pixels 32, 34, 35, and 37 on horizontal and vertical lines.

The compensation value and pixel group determiner 16 and the pixel group determiner 26 may determine an extreme and/or edge value level of the current restored pixel 30 by comparing the neighboring restored pixels 32, 34, 35, and 37 that are disposed to the top, left, right, and bottom of the current restored pixel 30, respectively, with the current restored pixel 30. When a parameter 'Pixel_Type' denotes the extreme and/or edge value level of the current restored pixel 30, $Rec[x][y]$ denotes a pixel value of the current restored pixel 30, and $Rec[x][y-1]$, $Rec[x-1][y]$, $Rec[x+1][y]$, and $Rec[x][y+1]$ respectively denote pixel values of the neighboring restored pixels, the extreme and/or edge value level may be determined as following classification formulas:

Pixel_Type=0;

if $(Rec[x][y] > Rec[x-1][y])$ Pixel_Type ++;

if $(Rec[x][y] < Rec[x-1][y])$ Pixel_Type --;

if $(Rec[x][y] > Rec[x+1][y])$ Pixel_Type ++;

if $(Rec[x][y] < Rec[x+1][y])$ Pixel_Type --;

if $(Rec[x][y] > Rec[x][y-1])$ Pixel_Type ++;

if $(Rec[x][y] < Rec[x][y-1])$ Pixel_Type --;

if $(Rec[x][y] > Rec[x][y+1])$ Pixel_Type ++;

if $(Rec[x][y] < Rec[x][y+1])$ Pixel_Type --.

Maximum and minimum values of 'Pixel_Type' may be assumed as +4 and −4.

If pixel classification pattern has different shape from an exemplary pixel classification pattern shown on FIG. 3, then classification formulas should be correspondingly modified. For example, during edge detection on diagonal direction of angle 45°, pixels 31 and 38 are compared to current pixel 30. The extreme and/or edge value level may be determined as following modified classification formulas:

Pixel_Type=0;

if (Rec[x][y]>Rec[x−1][y−1]) Pixel_Type ++;

if (Rec[x][y]<Rec[x−1][y−1]) Pixel_Type −−;

if (Rec[x][y]>Rec[x+1][y+1]) Pixel_Type ++;

if (Rec[x][y]<Rec[x+1][y+1]) Pixel_Type −−.

Correspondingly, maximum and minimum values of 'Pixel_Type' may be assumed as +2 and −2.

In other words, the extreme and/or edge value level is determined by comparing pixel values of the neighboring restored pixels 32, 34, 35, and 37 in a predetermined range of the current restored pixel 30 with a pixel value of the current restored pixel 30. When the extreme and/or edge value level of the current restored pixel 30 is a maximum extreme and/or edge value level, i.e., M, the current restored pixel 30 may be determined as a local maximum pixel, and when the extreme and/or edge value level of the current restored pixel 30 is a minimum extreme and/or edge value level, i.e., −M, the current restored pixel 30 may be determined as a local minimum pixel. A value of M may be determined based on a predetermined number of the analyzed neighboring restored pixels. The compensation value and pixel group determiner 16 and the pixel group determiner 26 may determine restored pixels determined as a local maximum pixel and a local minimum pixel as pixels to be compensated for.

As such, the compensation value and pixel group determiner 16 and the pixel group determiner 26 determine the extreme and/or edge value levels of the restored pixels in a current data unit, and determine a pixel group including restored pixels having the extreme and/or edge value level of M and a pixel group including restored pixels having the extreme and/or edge value level of −M. The compensation value and pixel group determiner 16 may determine the average value of the errors of the pixel values between the restored pixels and corresponding original pixels according to pixel groups, and determine the compensation value based on the average value. The pixel group determiner 26 and the restored pixel compensator 28 may compensate for the pixel values of the restored pixels according to pixel groups, by using the compensation value extracted from the received information about the compensation value.

The compensation value and pixel group determiner 16 and the pixel group determiner 26 may determine a pixel group including restored pixels adjacent to the local maximum pixel and local minimum pixel as a target to be compensated for. Accordingly, the compensation value and pixel group determiner 16 and the pixel group determiner 26 may determine compensation values for extreme and/or edge value levels in a predetermined range including the maximum extreme and/or edge value level and the minimum extreme and/or edge value level. For example, since the maximum extreme and/or edge value level is M as described above, restored pixels having an extreme and/or edge value level of M−1 are adjacent to the local maximum pixel.

Accordingly, the compensation value and pixel group determiner 16 and the pixel group determiner 26 may determine pixel groups including restored pixels having an extreme and/or edge value level higher than a predetermined positive value as pixel groups adjacent to the maximum extreme and/or edge value level, and pixel groups including restored pixels having an extreme and/or edge value level lower than a predetermined negative value as pixel groups adjacent to the minimum extreme and/or edge value level.

For example, when an extreme and/or edge value level is higher than m or lower than −m, i.e., when the extreme and/or edge value level is −M, −(M−1), −(M−2), . . . , −(m+1), (m+1), . . . , (M−1), or M, a compensation value according to extreme and/or edge value levels may be determined.

Alternatively, the compensation value and pixel group determiner 16 may calculate the average value of the errors between the restored pixels and the corresponding original pixels according to pixel groups adjacent to the maximum extreme and/or edge value level, and determine the compensation value according to the pixel groups. Also, the pixel group determiner 26 and the restored pixel compensator 28 may compensate for the pixel values of the restored pixels according to pixel groups, by using the compensation values according to pixel groups, which are extracted from the information about the compensation value.

Here, the 4 neighboring restored pixels 32, 34, 35, and 37 disposed to the top, left, right, and bottom of the current restored pixel 30, respectively, are used to determine the extreme and/or edge value level, but in order to classify the extreme and/or edge value level in detail, 8 restored pixels 31 through 38 around the current restored pixel 30 may be used as neighboring restored pixels to determine the extreme and/or edge value level of the current restored pixel 30.

Alternatively, the video encoding apparatus 10 and the video decoding apparatus 20 may classify pixel values into a number of bands equal to or above a predetermined number.

For example, when a bit depth of restored pixels is N, a total range of pixel values Rec[x][y] of the restored pixels is 0≤Rec[x][y]<$2^N$−1. In other words, a maximum value Max of the pixel value Rec[x][y] is $2^N$−1, and a section of the restored pixels is [0, Max]. The compensation value and pixel group determiner 16 and the pixel group determiner 26 may split the section of the restored pixels into L bands. In other words, the band of the restored pixel may be split into [0, (Max+1)/L−1], [Max/L, 2*(Max+1)/L−1], and [2*Max/L, 3*(Max+1)/L−1] through [(L−1)*Max/L, L*(Max+1)/L−1].

Actual original data may be inside diapason [Min, Max]. A minimum value Min and a maximum value Max are not mandatorily equal to 0 and $2^N$−1, respectively. The number of different values may correspond to a range of Actual original data, that is, 'Range=Max−Min+1'. If bands of the restored pixels are split uniformly, uniform bands are split into [Min, Range/L−1], [Max/L, 2*Range/L−1], and [2*Max/L, 3*Range/L−1] through [(L−1)*Range/L, Max]. In other exemplary embodiment, bands of the restored pixels may be non-uniformly split.

The number L of the split bands of the section [0, Max] of the restored pixels may be a multiple of 2, and may be 16 or more for quick calculation. Also, for quick calculation, the number L may be determined in such a way that a number p of most significant bits of the restored pixels is within an index of 2. For example, when the most significant bits of the restored pixel is 4 bits (p=4), and an extended bit depth of the restored pixels is 12 bits, the number L may be $2^P$=16. Accordingly, the band of the restored pixels of the extended bit depth may be split as shown in Table 1 below.

TABLE 1

| Band No. | 0 | 1 | 2 | ... | 16 |
|---|---|---|---|---|---|
| Band of Pixel Values of Restored Pixel | [0, 255] | [256, 511] | [512, 767] | ... | [3840, 4095] |
| Hexadecimal Expression of Pixel Value | [0x0000, 0x00FF] | [0x0100, 0x01FF] | [0x0200, 0x02FF] | ... | [0x0F00, 0x0FFF] |

Since bit calculation is easily performed when the band of the pixel values is split based on the number of most significant bits of the restored pixels, the pixel group determiner 26 may efficiently perform calculation for determining the band.

The compensation value and pixel group determiner 16 and the pixel group determiner 26 may classify restored pixels in the same bands into a pixel group according to bands. The bands may be split based on actual minimum and maximum values of original or reconstructed signal.

An average value of errors between the restored pixels included in the pixel group according to bands, and the original pixels is not 0. Accordingly, the compensation value and pixel group determiner 16 may determine a compensation value by using the average value according to bands. Also, the pixel group determiner 26 and the restored pixel compensator 28 may compensate for pixel values of the restored pixels in the pixel group according to bands, by using the compensation values according to bands.

Alternatively, the video encoding apparatus 10 and the video decoding apparatus 20 may classify restored pixels into pixel groups including restored pixels forming a predetermined line.

The compensation value and pixel group determiner 16 and the pixel group determiner 26 may analyze image characteristics of the restored image, and detect lines in a vertical direction, horizontal direction, a diagonal direction, a curved direction and a boundary direction of a predetermined object. The compensation value and pixel group determiner 16 and the pixel group determiner 26 may determine restored pixels forming the same line as a pixel group according to lines.

An average value of errors of pixel values between restored pixels included in the pixel group according to lines, and original pixels is also not 0. The compensation value and pixel group determiner 16 may determine a compensation value by using the average value according to lines. The pixel group determiner 26 and the restored pixel compensator 28 may compensate for pixel values of the restored pixels in the pixel group according to lines, by using the compensation value according to lines.

The compensation value and pixel group determiner 16 and the pixel group determiner 26 may determine the compensation value according to extreme and/or edge value levels, according to data units, such as image sequences, frames, or blocks of a video. The transmitter 18 may encode and transmit the information related to the compensation value as overhead information. Accuracy of the compensation value increases as a data unit for determining the compensation value according to extreme and/or edge value levels decreases, but overhead may increase since additional information for encoding and transmitting the information related to the compensation value may increase.

Also, the extractor 22 may extract the information related to the compensation value from overhead information or slice header information and compensate for the pixel values of the restored pixels by using the compensation value.

The restored image generators 14 and 24 may selectively perform adaptive loop filtering on image data decoded in a spatial domain. The restored image generators 14 and 24 may restore a current picture by continuously performing one-dimensional filtering in a horizontal direction and in a vertical direction, according to the adaptive loop filtering.

The transmitter 18 of the video encoding apparatus 10 may encode and output a filter coefficient used in the adaptive loop filtering. Also, since a type, a number, a size, a quantization bit, a coefficient, a filtering direction of each one-dimensional filter, and whether filtering and running filtering are performed may be set for the adaptive loop filtering, information about a set of one-dimensional filters of loop filtering may be encoded and transmitted.

The restored image generator 24 may induce a filter coefficient of each one-dimensional filter by using residual information of the filter coefficient extracted from the extractor 22.

For example, a current filter coefficient of each one-dimensional filter may be induced by adding a difference between the current filter coefficient and a previous filter coefficient to the previous filter coefficient. The continuous one-dimensional filtering may be performed on deblocked data by using the induced filter coefficient of each one-dimensional filter. The deblocking is performed to reduce a blocking effect of decoded data, and the loop filtering minimizes an error between the restored image and the original image.

For deeper understanding, the loop filtering using the continuous one-dimensional filtering in a horizontal direction and a vertical direction will be described with reference to the following equations.

The current filter coefficient may be induced according to Equation 7 below.

$$c[i][j] = \text{adaptive\_loop\_filter\_prev}[i][j] + \text{adaptive\_loop\_filter}[i][j]. \quad \text{Equation 7}$$

Here, i denotes an index of a one-dimensional filter and j denotes an index of a filter coefficient of a one-dimensional filter. $c[i][j]$ denotes a current filter coefficient, adaptive_loop_filter_prev$[i][j]$ denotes a previous filter coefficient, and adaptive_loop_filter$[i][j]$ denotes a residual component of a filter coefficient transmitted as filter coefficient information.

In other words, the current filter coefficient may be induced from a sum of the previous filter coefficient and the residual component. In order to induce a following filter coefficient after inducing the current filter coefficient, the current filter coefficient $c[i][j]$ is updated to adaptive_loop_filter_prev$[i][j]$.

The loop filtering using continuous one-dimensional filtering may be performed according to Equations 8 and 9 below. In Equations 8 and 9, i denotes an index in a width direction of a current picture and j denotes an index in a height direction of the current picture.

$$q_{i,j} = (p_{i,j-4}*c[0][4] + p_{i,j-3}*c[0][3] + p_{i,j-2}*c[0][2] + p_{i,j-1}*c[0][1] + p_{i,j}*c[0][0] + p_{i,j+1}*c[0][1] + p_{i,j+2}*c[0][2] + p_{i,j+3}*c[0][3]p_{i,j+4}*c[0][4]). \quad \text{Equation 8}$$

Here, $p_{i,j}$ denotes deblocked data of the current picture, and $q_{i,j}$ denotes one-dimensional filtered data in a horizontal direction with respect to the deblocked data. 5 filter coefficients are used to symmetrically filter 9 pieces of deblocked data, by using a filter coefficient c of a symmetrical filter.

$$f_{i,j} = (q_{i,j-4}*c[1][4] + q_{i,j-3}*c[1][3] + q_{i,j-2}*c[1][2] + q_{i,j-1}*c[1][1] + q_{i,j}*c[1][0] + q_{i,j+1}*c[1][1] + q_{i,j+2}*c[1][2] + q_{i,j+3}*c[1][3] + q_{i,j+4}*c[1][4]). \quad \text{Equation 9}$$

Here, $f_{i,j}$ denotes one-dimensional filtered data in a vertical direction with respect to the one-dimensional filtered data $q_{i,j}$. Since the filter coefficient c uses a running filtering method, one-dimensional filtering is continuously performed in a vertical direction on the one-dimensional filtered data in a horizontal direction.

In the symmetrical filter, a one-dimensional filter is able to set coefficients of all filters by only using a small amount of coefficients, compared to a two-dimensional filter. Accordingly, bits related to filter characteristics of a plurality of one-dimensional filters, which are inserted into a transmission bitstream, may be relatively low compared to a two-dimensional filter.

Also, memory capacity for storing temporary data during filtering is smaller in the one-dimensional filter than the two-dimensional filter. Filtering throughput of the two-dimensional filter is remarkably large compared to that of the one-dimensional filtering. In the running filtering, it is not possible to perform a parallel process according to multiple filtering by using the two-dimensional filter, but it is possible to perform a parallel process by using the one-dimensional filter.

However, the loop filtering is not limited to the continuous one-dimensional filtering in horizontal and vertical directions. The loop filtering may be performed as a predetermined number of one-dimensional filters perform continuous one-dimensional filtering, wherein each one-dimensional filtering is performed in a predetermined direction.

The video decoding apparatus 20 may receive information about a set of one-dimensional filters, aside from the information about the filter coefficient, so as to check a type, a number, a size, a quantization bit, a coefficient, a filtering direction of each one-dimensional filter, and whether filtering and running filtering are performed. Accordingly, the restored image generator 24 may perform loop filtering by combining various one-dimensional filters.

The adaptive loop filtering performed by the restored image generators 14 and 24 will now be described with reference to FIGS. 4 and 5.

Figure 4:
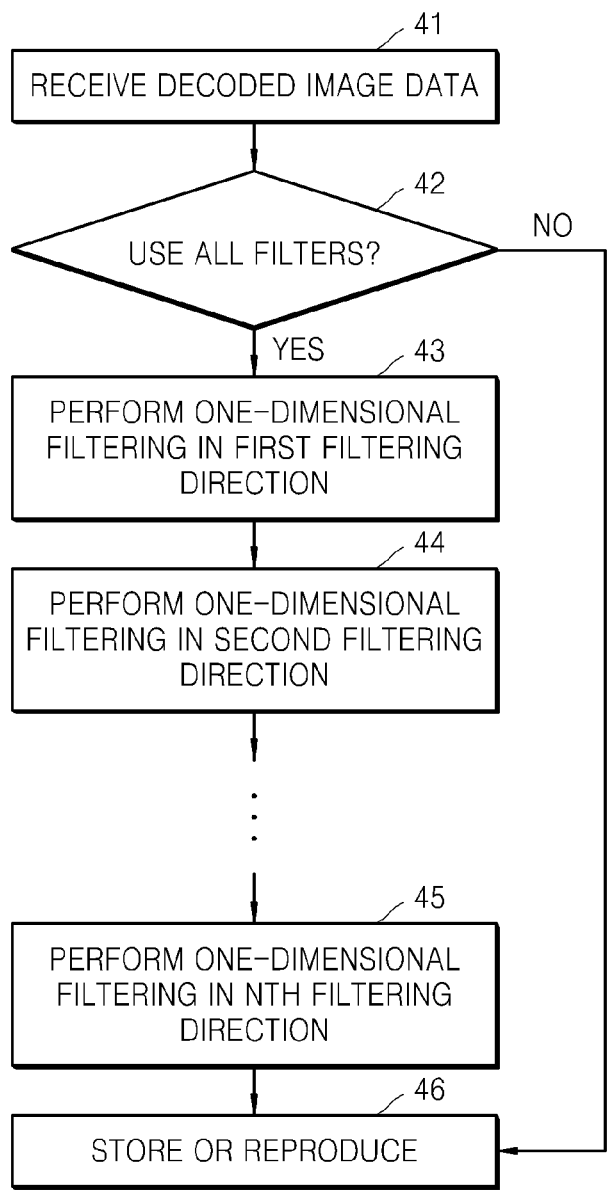
FIG. 4 is a flowchart for describing adaptive loop filtering according to an exemplary embodiment.

FIG. 4 is a flowchart for describing adaptive loop filtering according to an exemplary embodiment.

Loop filtering may be performed as a plurality of one-dimensional filters continuously performing filtering. In operation 41, decoded image data is received. Alternatively, image data on which deblocking filtering is performed after decoding may be received. In operation 42, it is determined whether all of first through Nth filters are to be used. If it is determined that the first through Nth filters are not to be used, operation 46 is performed. If it is determined that the first through Nth filters are to be used in operation 42, one-dimensional filtering may be performed according to a filtering order, for example, the first filter performs one-dimensional filtering in a first filtering direction in operation 43 and the second filter performs one-dimensional filtering in a second filtering direction in operation 44, until the Nth filter performs one-dimensional filtering in an Nth filtering direction in operation 45.

In operation 46, decoded image data, deblocked image data, or continuously one-dimensional filtered data is stored in a buffer or reproduced by a reproducer.

A filtering direction of a one-dimensional filter may be adaptively determined according to characteristics of a local image, by analyzing the characteristics. For example, the filtering direction may be adaptively determined as an edge direction of a local image so as to conserve an edge of the local image.

FIG. 5 is a flowchart for describing adaptive loop filtering according to another exemplary embodiment.

When decoded image data or deblocked image data is received in operation 51, an edge is detected for each pixel of the decoded image data or deblocked image data in operation 52. In operation 53, one-dimensional filtering is performed according to the detected edge, and filtered data is stored or reproduced by a reproducer in operation 54.

Information about a set of one-dimensional filters including a filtering direction determined according to the edge is encoded and provided to a decoder while encoding a video. Information about a loop filter is read from received data while decoding a video, and one-dimensional filtering according to a filtering direction, such as an edge direction, may be performed by a predetermined one-dimensional filter.

A post-process constituting the loop filtering may reduce distortion between an original image and a restored image, which is generated due to complex loss compression. Also, a loop filtered image may be used as a reference image so as to improve quality of an image obtained by performing prediction or motion compensation.

Accordingly, the restored image generators 14 and 24 may selectively perform adaptive loop filtering considering characteristics of an image, a system environment, or user requirements by combining one-dimensional filters having various characteristics. Since continuous one-dimensional filters are used instead of a two-dimensional filter so as to perform the adaptive loop filtering, the adaptive loop filtering may be advantageous in terms of memory, throughput, amount of transmission bits, etc., compared to the two-dimensional filter. When the restored image generators 14 and 24 perform the adaptive loop filtering, the transmitter 18 and the extractor 22 transmit and receive information obtained by encoding a residual component of an encoded filter coefficient, and thus an amount of information used for the adaptive loop filtering may be reduced.

FIG. 6 is a flowchart illustrating a method of encoding a video for compensating for a pixel value, according to an exemplary embodiment.

In operation 62, an input image sequence is encoded. In operation 64, the encoded image data is decoded, and a restored image is generated by performing loop filtering on the decoded image data. The restored image may be generated by performing adaptive loop filtering, wherein at least one one-dimensional filtering operation is continuously performed on the decoded image data or deblocked image data.

In operation 66, a compensation value about an error between each restored pixel of a predetermined group in the restored image, and a corresponding original image, and a pixel group including restored pixels to be compensated for are determined. The pixel group including the restored pixels to be compensated for may be determined according to extreme and/or edge value levels of pixel values, bands of pixel values, or lines. The compensation value according to pixel groups may be determined based on an average value of the errors.

In operation 68, the compensation value is encoded, and a bitstream of the encoded compensation value and the encoded input image sequence is transmitted. When the compensation value is determined according to more detailed pixel groups, the pixel values may be accurately compensated for, but overhead may increase.

FIG. 7 is a flowchart illustrating a method of decoding a video for compensating for a pixel value, according to an exemplary embodiment.

In operation 72, a bitstream about an encoded image is received and parsed, and encoded image data and a compensation value are extracted from the bitstream.

In operation 74, the encoded image data is decoded, and a restored image is generated by performing loop filtering on the decoded image data. The restored image may be generated by performing adaptive loop filtering, wherein at least one one-dimensional filtering operation is continuously performed on the decoded image data or deblocked image data.

In operation 76, a pixel group including restored pixels to be compensated for by using the compensation value is determined from among restored pixels in the restored image. The pixel group including the restored pixels to be compensated for by using the compensation value may be determined according to extreme and/or edge value levels of pixel values of the restored pixels, bands of the pixel values, or lines, according to a method of determining a pixel group, based on information related to the compensation value. In operation 78, the restored image having a compensated error may be output by compensating for an error between restored pixels of the determined pixel group and original pixels by using the compensation value.

According to the method of encoding a video and the method of decoding a video, the quality of the restored image may be improved by compensating for a systematic error of the restored image, and the amount of transmission bits of additional information for improving the quality of the restored image may be reduced since only the information about the compensation value according to pixel groups is encoded and transmitted, and information about locations of restored pixels to be compensated for is not transmitted.

Hereinafter, the encoding and decoding a video for compensating for a pixel value after performing loop filtering based on coding units having a tree structure, according to exemplary embodiments, will be described with reference to FIGS. 8 through 22.

FIG. 8 is a block diagram of a video encoding apparatus 80 for encoding a video for compensating for a pixel value after performing loop filtering based on coding units having a tree structure, according to an exemplary embodiment.

The video encoding apparatus 80 according to the current exemplary embodiment includes an encoder 81, a restored image generator 84, a compensation value and pixel group determiner 87, and a transmitter 88. The encoder 81 includes a maximum coding unit splitter 82 and coded depth and encoding mode determiner 83. The restored image generator 84 includes a decoder 85 and a loop filtering performer 86.

The encoder 81 encodes an input image sequence. The encoder 81 may encode the input image sequence based on coding units having a tree structure. The maximum coding unit splitter 82 may split a current picture based on a maximum coding unit for the current picture of an image. The maximum coding unit according to an exemplary embodiment may be a data unit having a size of 32×32, 64×64, 128×128, 256×256, etc., wherein a shape of the data unit is a square having a width and length in squares of 2.

If the current picture is larger than the maximum coding unit, image data of the current picture may be split into the at least one maximum coding unit. The image data may be output to the coded depth and encoding mode determiner 83 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coded depth and encoding mode determiner 83 encodes at least one split region obtained by splitting a region of the maximum coding unit according to depths, and determines a depth to output a finally encoded image data according to the at least one split region. In other words, the coded depth and encoding mode determiner 83 determines a coded depth by encoding the image data in the deeper coding units according to depths, according to the maximum coding unit of the current picture, and selecting a depth having the least encoding error. Thus, the encoded image data of the coding unit corresponding to the determined coded depth is output. Also, the coding units corresponding to the coded depth may be regarded as encoded coding units. The determined coded depth and the encoded image data according to the determined coded depth are output to the transmitter 88.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each of the coding units, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be split according to coding units of at least one coded depth.

Accordingly, the coded depth and encoding mode determiner 83 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A maximum depth according to an exemplary embodiment may denote the total number of splitting times from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the maximum depth may be set to 4.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including prediction encoding and transformation is performed on all of the deeper coding units generated as the depth deepens. For convenience of description, the prediction encoding and the transformation will now be described based on a coding unit of a current depth, in a maximum coding unit.

The video encoding apparatus 80 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 80 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or a width of the prediction unit, partitions obtained by asymmetrically splitting the height or the width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 80 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into 4^1 transformation units, and the size of the transformation unit is thus N×N, and may be 2 when each of the height and width of the current coding unit is split into four equal parts, totally split into 4^2 transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similar to the coding unit, the transformation unit in the coding unit may be recursively split into smaller sized regions, so that the transformation unit may be determined independently in units of regions. Thus, residual data in the coding unit may be split according to the transformation having the tree structure according to transformation depths.

Encoding information according to coding units corresponding to a coded depth uses not only information about the coded depth, but also about information related to prediction encoding and transformation. Accordingly, the coded depth and encoding mode determiner 83 not only determines a coded depth having a least encoding error, but also determines a partition type in a prediction unit, a prediction mode according to prediction units, and a size of a transformation unit for transformation.

The coded depth and encoding mode determiner 83 may measure an encoding error of deeper coding units according to depths by using Rate-Distortion Optimization based on Lagrangian multipliers.

The restored image generator 84 decodes encoded image data and generates a restored image by performing loop filtering on the decoded image data. The decoder 85 included in the restored image generator 84 decodes image data based on coding units having a tree structure, which is encoded by the encoder 81. The decoder 85 may decode the encoded image data and output image data of a spatial domain according to maximum coding units, based on the coded depth and the encoding mode determined by the coded depth and encoding mode determiner 83.

The loop filtering performer 86 included in the restored image generator 84 may perform in-loop filtering on the decoded image data. The same adaptive loop filtering selectively performed by the restored image generator 14 may be performed by the loop filtering performer 86. Accordingly, the loop filtering performer 86 may continuously perform one-dimensional filtering in a horizontal direction and one-dimensional filtering in a vertical direction to restore the current picture. The loop filtering performer 86 may output the restored image to the compensation value and pixel group determiner 87.

The compensation value and pixel group determiner 87 determines a compensation value about an error between each of the restored pixels of a predetermined group in the restored image, and a corresponding original pixel, and a group pixel including restored pixels having pixel values to be compensated for. The compensation value and pixel group determiner 87 is a technical element corresponding to the compensation value and pixel group determiner 16.

Accordingly, the compensation value and pixel group determiner 87 may determine an extreme and/or edge value level of neighboring restored pixels of the restored image according to restored pixels, and classify the neighboring restored pixels into pixel groups according to extreme and/or edge value levels. Alternatively, the compensation value and pixel group determiner 87 may classify the restored pixels into pixel groups according to bands based on a pixel value. Alternatively, the compensation value and pixel group determiner 87 may detect lines in a predetermined direction by analyzing the restored image, and classify the restored pixels into pixel groups according to lines, which include the restored pixels on the same line.

The compensation value and pixel group determiner 87 may individually determine a compensation value for each pixel group by using an average value of the errors between the restored pixel and the corresponding original pixel. The compensation value and pixel group determiner 87 may determine a restored pixel to be compensated for according to at least one data unit from among an image sequence, a slice, a frame, and a coding unit of an input video, and determine a compensation value corresponding to the determined restored pixel to be compensated for. Information about the compensation value and the pixel group determined by the compensation value and pixel group determiner 87 may be output to the transmitter 88.

The transmitter 88 outputs the image data of the maximum coding unit, which is encoded based on the at least one coded depth determined by the coded depth and encoding mode determiner 83, and information about the encoding mode according to the coded depth, in bitstreams. The image data encoded by the encoder 81 may be converted to a bitstream format via entropy encoding, and then inserted into a bitstream for transmission.

Alternatively, the transmitter 88 may encode and insert the compensation value determined by the compensation value and pixel group determiner 86 into the bitstream for transmission. Alternatively, the transmitter 88 may receive additional information about a method of determining a pixel group from the compensation value and pixel group determiner 87, and encode and insert the additional information into a bitstream.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the transmitter 88 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the transmitter 88 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a Sequence Parameter Set (SPS) or a header of a bitstream.

The transmitter 88 may encode and output a filter coefficient used in adaptive loop filtering. Also, since a type, a number, a size, a quantization bit, a coefficient, a filtering direction of each one-dimensional filter, and whether filtering and running filtering are performed may be set for the adaptive loop filtering, information about a set of one-dimensional filters of loop filtering may be encoded and transmitted.

In the video encoding apparatus 80, the deeper coding unit may be a coding unit obtained by dividing a height or a width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 80 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or a large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 80 according to an exemplary embodiment, image compression efficiency may be increased since a coding unit is adjusted while considering characteristics of an image while increasing a maximum size of a coding unit while considering a size of the image.

Also, the amount of transmission bits of additional information may be reduced since information about a compensation value for compensating for a pixel value between a restored image and an original image, which is required to improve the quality of the restored image by a decoder, is encoded and transmitted without information about a pixel location.

Figure 9:
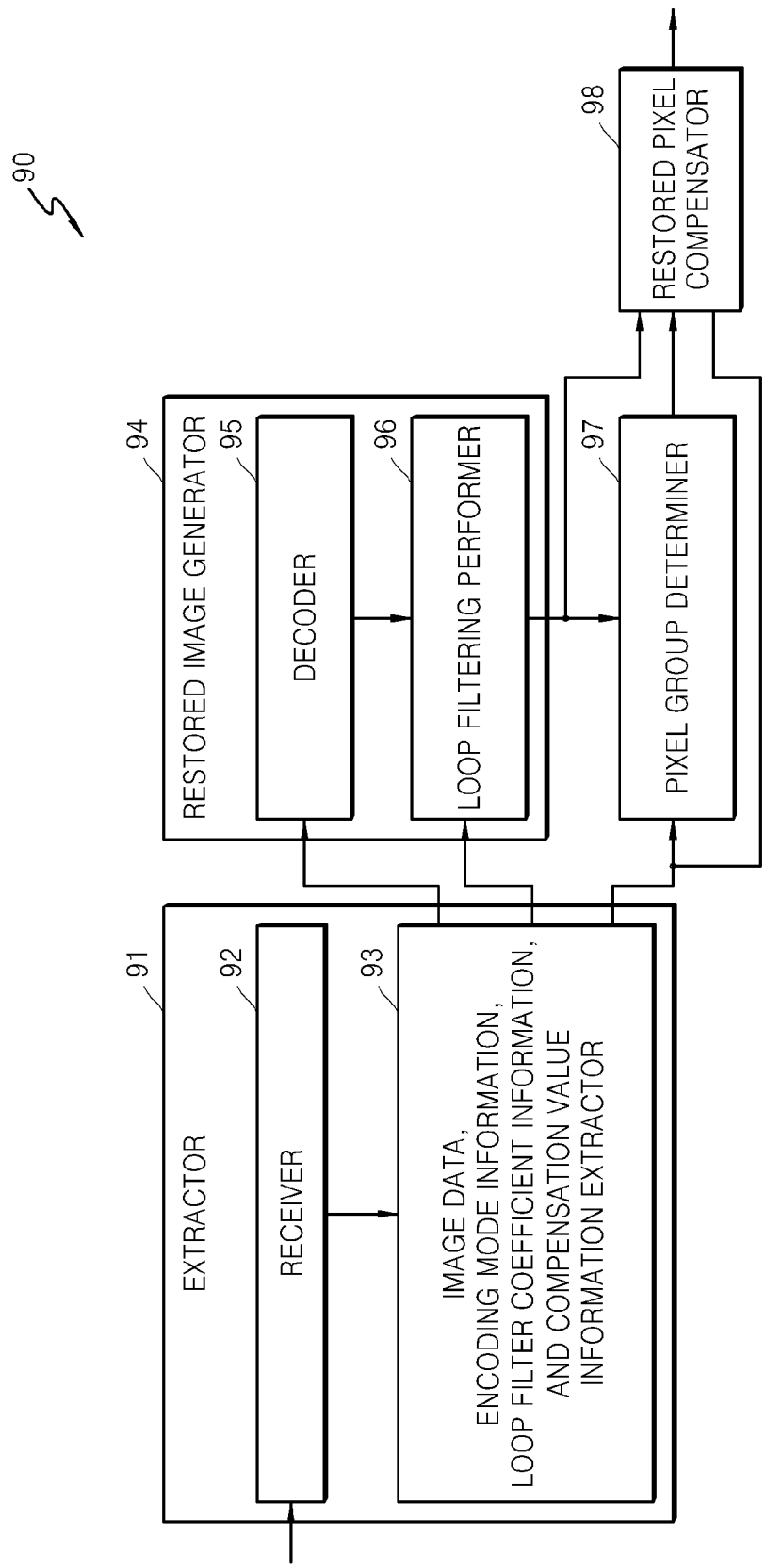
FIG. 9 is a block diagram of an apparatus for decoding a video by compensating for a pixel value after performing loop filtering based on coding units having a tree structure, according to an exemplary embodiment.

FIG. 9 is a block diagram of a video decoding apparatus 90 for compensating for a pixel value after performing loop filtering based on coding units having a tree structure, according to an exemplary embodiment.

The video decoding apparatus 90 includes an extractor 91, a restored image generator 94, a pixel group determiner 97, and a restored pixel compensator 98. The extractor 91 includes a receiver 92, and an image data, encoding mode information, loop filter coefficient information, and compensation value information extractor (hereinafter, referred to as an information extractor) 93. The restored image generator 94 includes a decoder 95 and a loop filtering performer 96.

Definitions of terms such as a coding unit, a depth, a prediction unit, a transformation unit, and various encoding modes for various processes used to describe the video decoding apparatus 90 are identical to those described with reference to the video encoding apparatus 80 of FIG. 8.

The extractor 91 receives and parses a bitstream of an encoded image, and extracts encoded image data and a compensation value from the bitstream. The receiver 92 of the extractor 91 receives and parses the bitstream of the encoded image. The information extractor extracts the image data according to maximum coding units from the parsed bitstream, and outputs the extracted image data to the decoder 95. The information extractor 93 may extract information about a maximum size of a coding unit of a current picture, from a header about the current picture.

Also, the information extractor 93 extracts information about a coded depth and an encoding mode for the coding units having a tree structure according to each maximum coding unit, from the parsed bitstream. The extracted information about the coded depth and the encoding mode is output to the decoder 95. In other words, the image data in a bit string is split into the maximum coding unit so that the decoder 95 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit.

The information about the coded depth and the encoding mode according to each maximum coding unit extracted by the information extractor 93 is information about a coded depth and an encoding mode determined to generate a minimum encoding error when an encoder, such as the video encoding apparatus 80, repeatedly performs encoding for each deeper coding unit according to depths according to each maximum coding unit. Accordingly, the video decoding apparatus 90 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the information extractor 93 may extract the information about the coded depth and the encoding mode according to the predetermined data units. The predetermined data units to which the same information about the coded depth and the encoding mode is assigned may be inferred to be the data units included in the same maximum coding unit.

The decoder 95 restores the current picture by decoding the image data in each maximum coding unit based on the information about the coded depth and the encoding mode according to the maximum coding units. In other words, the decoder 95 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to a method of inverse orthogonal transformation or inverse integer transformation.

Also, the decoder 95 may perform inverse transformation according to each transformation unit in the coding unit by reading the transformation units having a tree structure, based on the information about the size of the transformation unit of the coding unit according to coded depths, so as to perform the inverse transformation according to maximum coding units.

The decoder 95 may determine at least one coded depth of a current maximum coding unit by using split information according to depths. If the split information indicates that image data is no longer split in the current depth, the current depth is a coded depth. Accordingly, the decoder 95 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the decoder 95 in the same encoding mode.

When the information about the filter coefficient for the adaptive loop filtering is inserted into the bitstream, the information extractor 93 may extract the information about the filter coefficient from the bitstream. The loop filtering performer 96 may receive the information about the filter coefficient extracted by the information extractor 93, and generate the restored image by performing loop filtering on the image data decoded by the decoder 95.

The same technical element of the restored image generator 24 may be applied to the loop filtering performer 96. Accordingly, the loop filtering performer 96 may selectively perform deblocking filtering and adaptive loop filtering on the decoded image data. The adaptive loop filtering may be performed by using a continuous plurality of one-dimensional filters.

The restored image generator 94 may induce a filter coefficient of each one-dimensional filter by using residual information of the filter coefficient extracted from the information extractor 93. For example, a current filter coefficient of each one-dimensional filter may be induced by adding a difference between the current filter coefficient and a previous filter coefficient to the previous filter coefficient. The continuous one-dimensional filtering may be performed on deblocked data by using the induced filter coefficient of each one-dimensional filter. The deblocking is performed to reduce a blocking effect of decoded data, and the loop filtering minimizes an error between the restored image and the original image.

The information extractor 93 extracts encoded image data and information related to a compensation value from the bitstream. The information related to the compensation value may include information about the compensation value. Alternatively, if the information related to the compensation value includes information about a method of determining a pixel group to be compensated for by using the compensation value, the information extractor 93 may extract the compensation value and the information about the method of determining the pixel group to be compensated for from the bitstream. The information extractor 93 may extract the compensation value or the information related to the compensation value according to at least one data unit from among an image sequence, a slice, a frame, and a coding unit of an input video.

The pixel group determiner 97 may determine a pixel group including the restored pixel to be compensated for by using the compensation value, with respect to the restored pixels of a predetermined group in the restored image, by receiving the restored image generated by the restored image generator 94 and the compensation value extracted by the information extractor 93. The restored pixel compensator 98 compensates for the pixel value of the restored pixel by using the compensation value, and outputs the restored image having the restored pixel value by receiving the compensation value extracted by the information extractor 93 and information about the pixel group determined by the pixel group determiner 97.

When the information about the method of determining the pixel group to be compensated for is extracted by the information extractor 93, the pixel group determiner 97 may selectively determine the pixel group having the pixel value to be compensated for based on the method. For example, the pixel group determiner 97 may determine whether to classify the restored pixels according to the extreme and/or edge value levels, the bands of pixel values, or the lines, and determine the pixel group having the pixel values to be compensated for, based on the method. Here, the restored pixel compensator 98 may compensate for the pixel values of the restored pixels in the pixel group by using the compensation values for the pixel group according to extreme and/or edge value levels, bands of pixel values, or lines.

The video decoding apparatus 90 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and the amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

The video encoding apparatus 80 and the video decoding apparatus 90 may compensate for a systematic error generated between the restored image and the original image when the encoded image is decoded and restored.

Encoding and decoding of a video based on coding units having a tree structure, according to exemplary embodiments.

Figure 10:
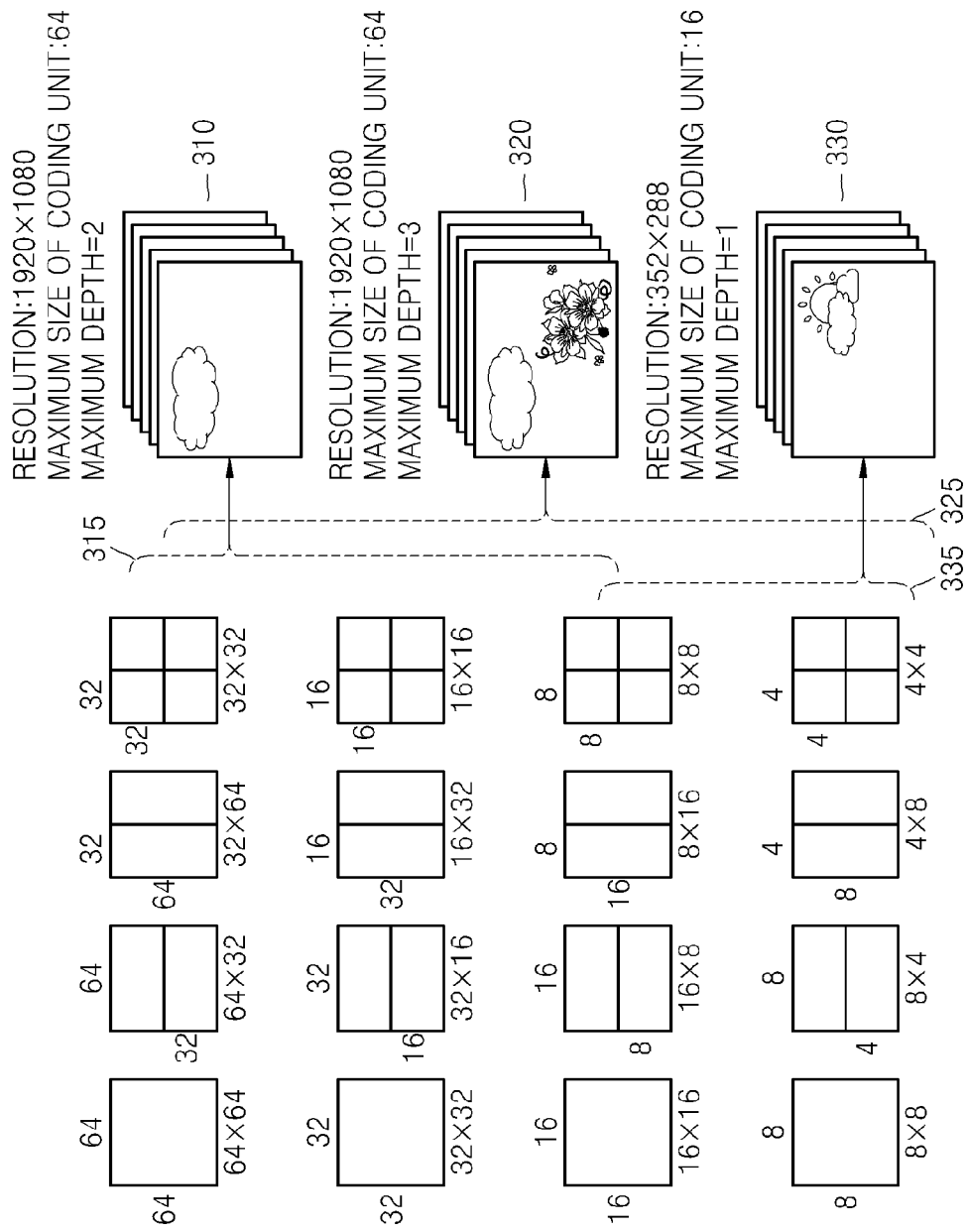
FIG. 10 is a diagram for describing a concept of coding units according to an exemplary embodiment.

FIG. 10 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 11:
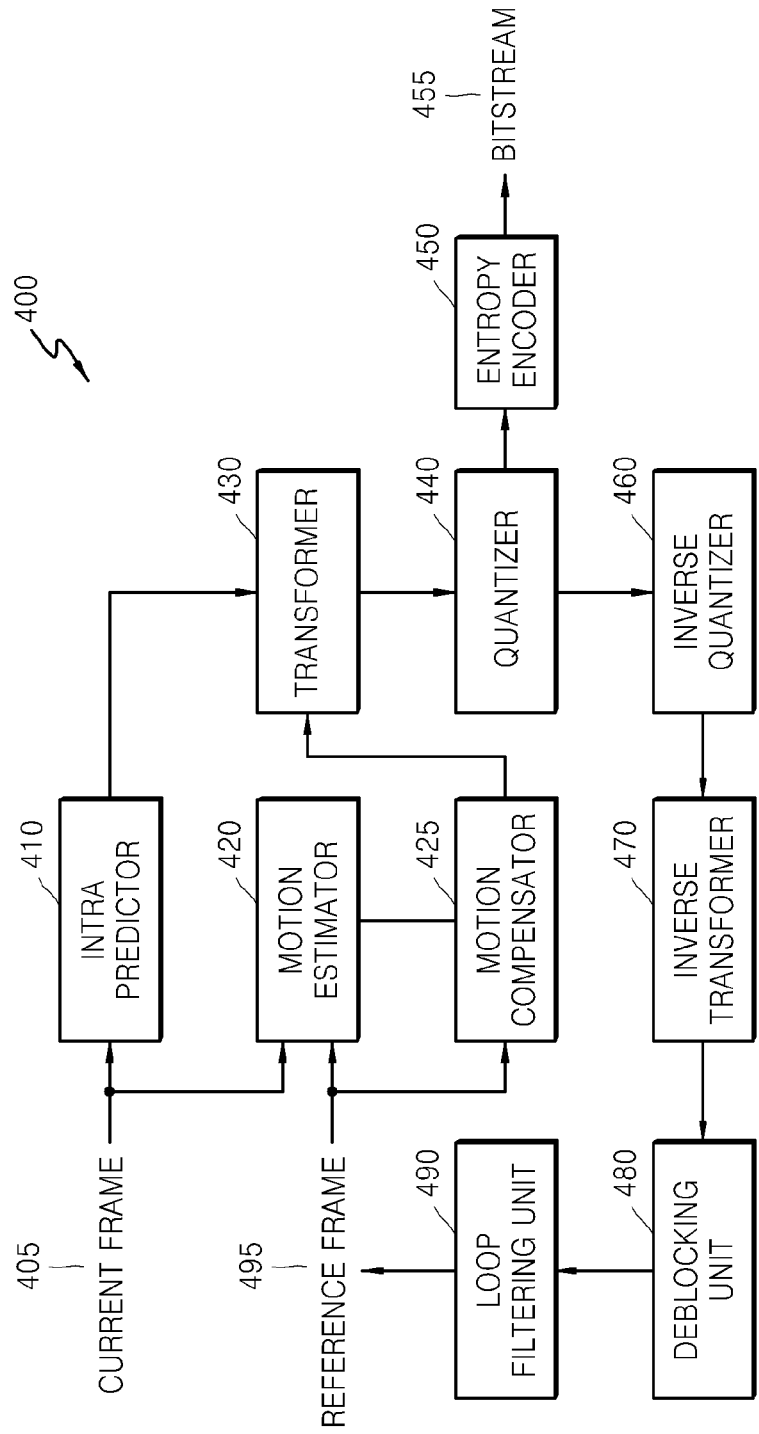
FIG. 11 is a block diagram of an image encoder based on coding units according to an exemplary embodiment.

FIG. 11 is a block diagram of an image encoder 400 based on coding units, according to an exemplary embodiment.

The image encoder 400 performs operations of the encoder 81 of the video encoding apparatus 80 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 80, elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 12:
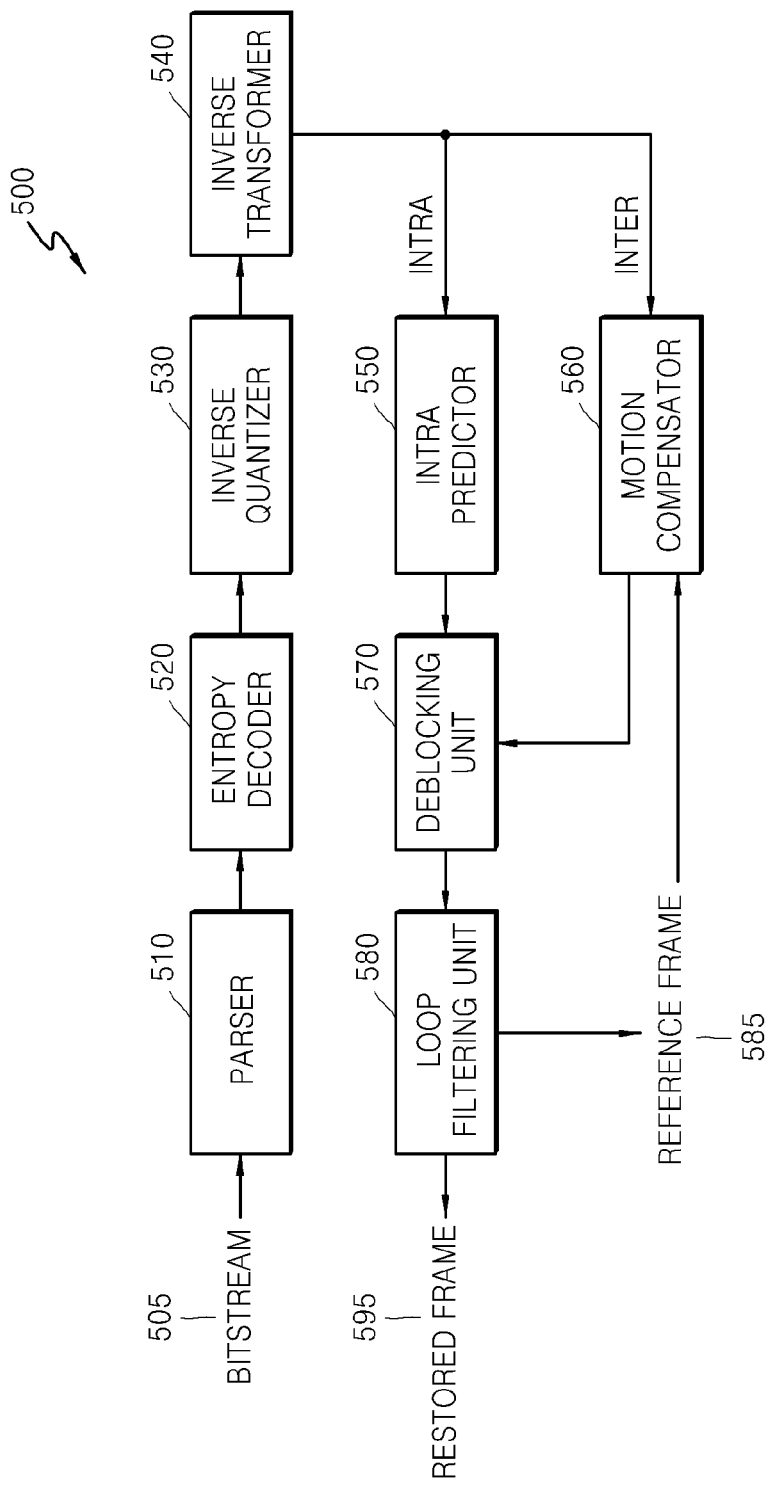
FIG. 12 is a block diagram of an image decoder based on coding units according to an exemplary embodiment.

FIG. 12 is a block diagram of an image decoder 500 based on coding units, according to an exemplary embodiment.

A parser 510 parses encoded image data to be decoded and information about encoding used for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the decoder 95 of the video decoding apparatus 90, the image decoder 500 may perform operations that are performed after the parser 510.

In order for the image decoder 500 to be applied in the video encoding apparatus 90, elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 13:
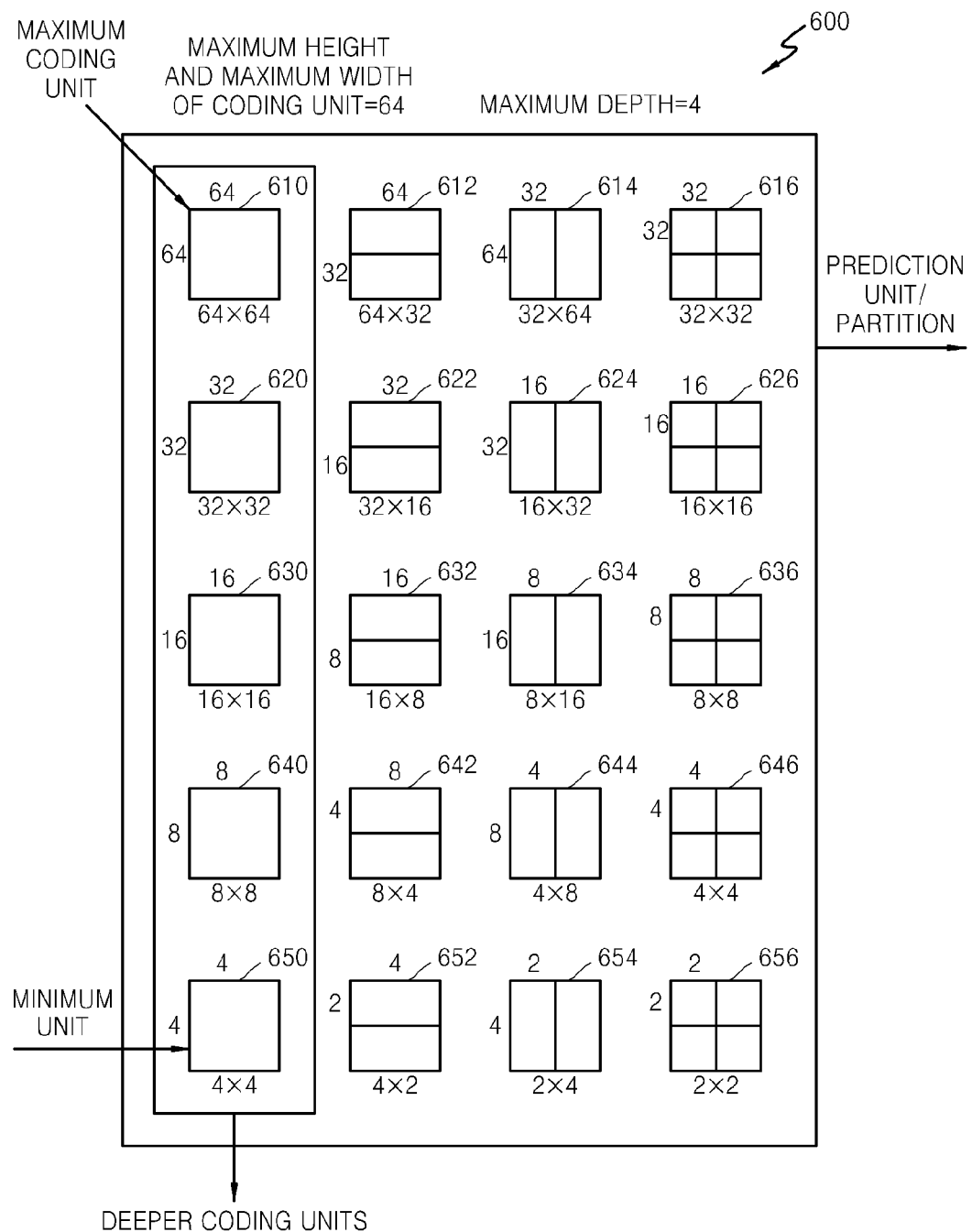
FIG. 13 is a diagram illustrating deeper coding units according to depths, and partitions, according to an exemplary embodiment.

FIG. 13 is a diagram illustrating deeper coding units according to depths, and partitions, according to an exemplary embodiment.

The video encoding apparatus 80 and the video decoding apparatus 90 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 may be only assigned to a partition having a size of 4×4. Alternatively, partitions 652 having a size of 4×2, partitions 654 having a size of 2×4, or partitions 656 having a size of 2×2 may be used.

In order to determine the at least one coded depth of the coding units constituting the maximum coding unit 610, the coded depth and encoding mode determiner 83 of the video encoding apparatus 80 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 14 is a diagram for describing a relationship between a coding unit 710 and transformation units 720, according to an exemplary embodiment.

The video encoding apparatus 80 or the video decoding apparatus 90 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 80 or the video decoding apparatus 90, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 15 is a diagram for describing encoding information of coding units corresponding to a coded depth, according to an exemplary embodiment.

The transmitter 88 of the video encoding apparatus 80 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The information extractor 93 of the video decoding apparatus 90 may extract and use the information 800, 810, and 820 for decoding, according to each deeper coding unit.

Figure 16:
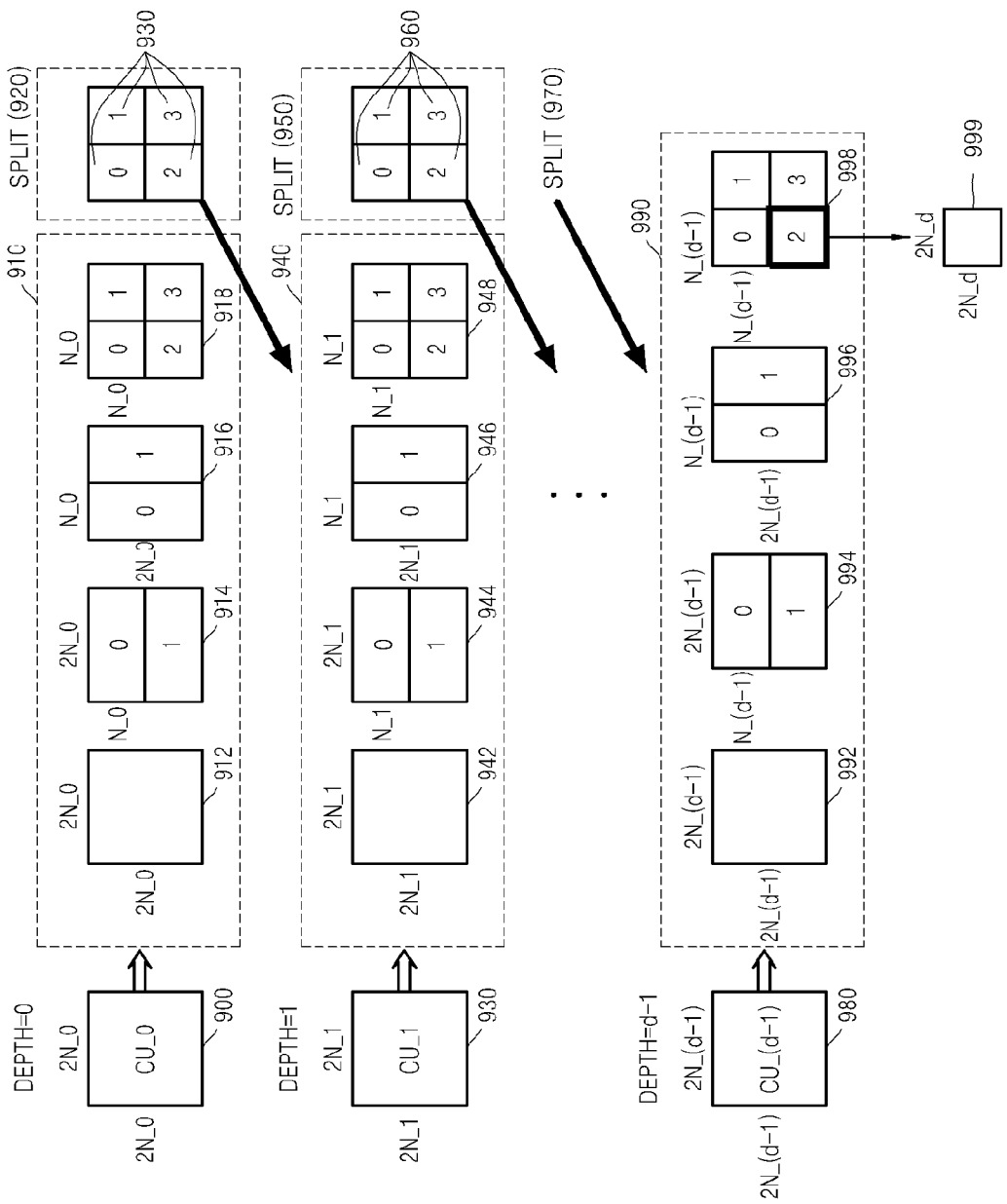
FIG. 16 is a diagram of deeper coding units according to depths, according to an exemplary embodiment.

FIG. 16 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 80 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The information extractor 93 of the video decoding apparatus 90 may extract and use the information about the coded depth and the prediction unit of the coding unit 900 to decode the partition 912. The video decoding apparatus 90 may determine a depth, in which split information is 0, as a coded depth by using split information according to depths, and use information about an encoding mode of the corresponding depth for decoding.

Figure 17:
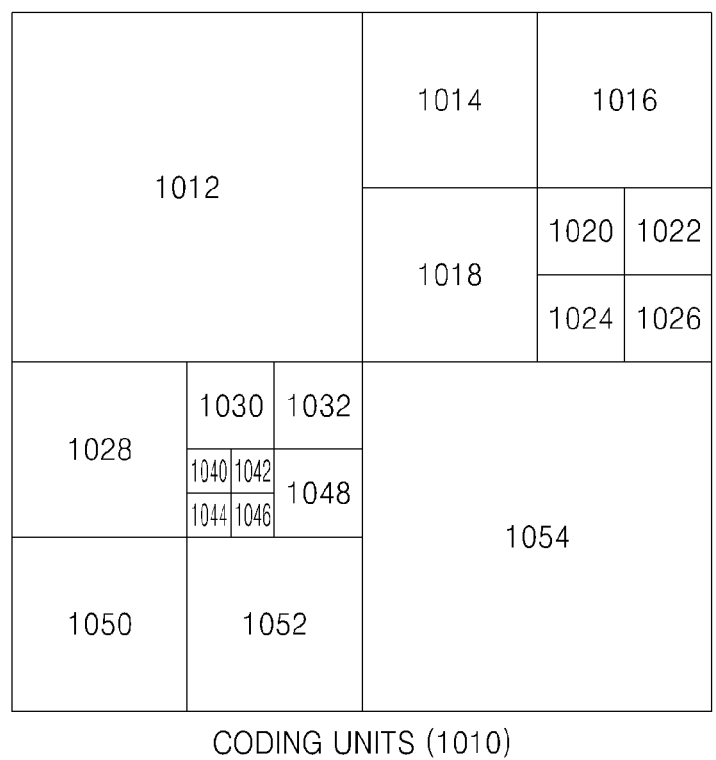
FIGS. 17 through 19 are diagrams for describing a relationship between coding units, prediction units, and transformation units, according to an exemplary embodiment.
Figure 18:
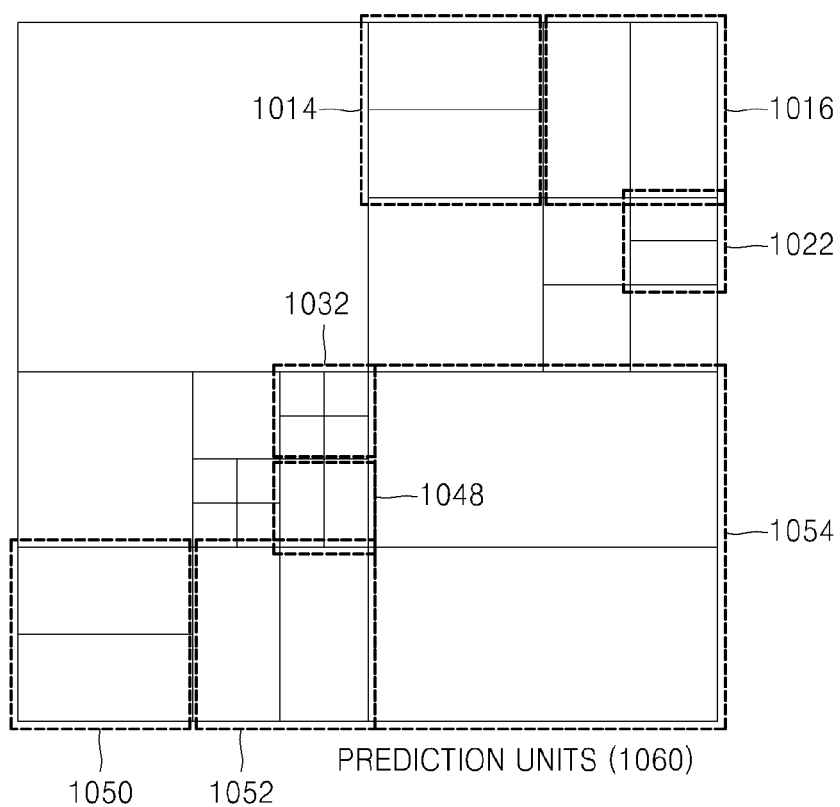
Figure 19:
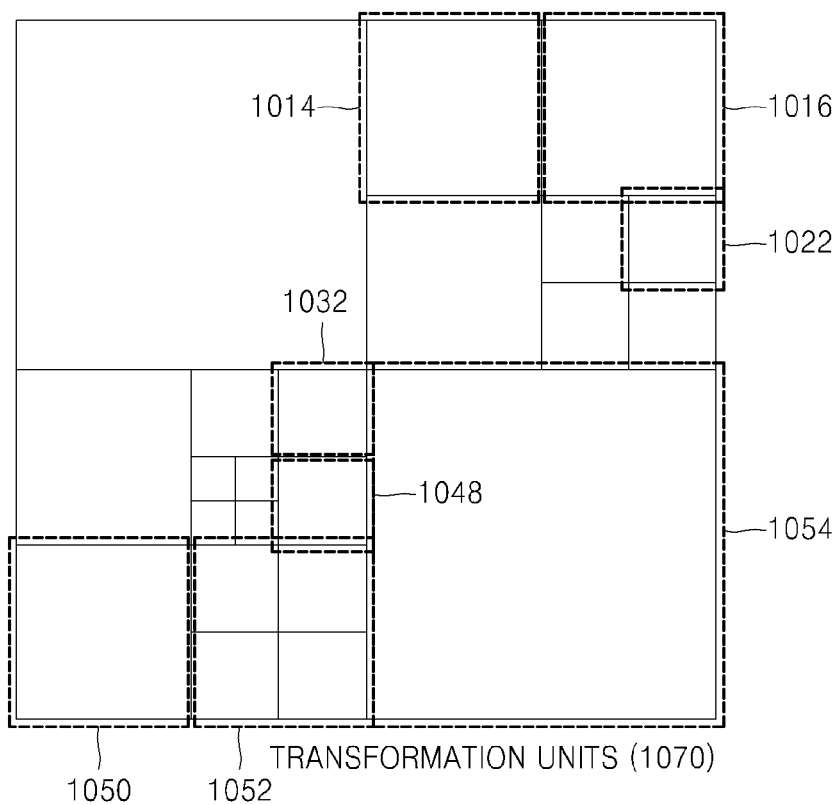

FIGS. 17 through 19 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 80, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 2 shows the encoding information that may be set by the video encoding and decoding apparatuses 80 and 90.

TABLE 2

| | Split Information 0 (Encoding on Coding Unit having Size of 2Nx2N and Current Depth of d) | | | | Split Information 1 |
|---|---|---|---|---|---|
| | Partition Type | | Size of Transformation Unit | | |
| | | | Split Information 0 of Transformation Unit | Split Information 1 of Transformation Unit | |
| Prediction Mode | Symmetrical Partition Type | Asymmetrical Partition Type | | | |
| Intra Inter Skip (Only 2Nx2N) | 2Nx2N 2NxN Nx2N NxN | 2NxnU 2NxnD nLx2N nRx2N | 2Nx2N | NxN (Symmetrical Type) N/2xN/2 (Asymmetrical Type) | Repeatedly Encode Coding Units having Lower Depth of d + 1 |

The transmitter 88 of the video encoding apparatus 80 may output the encoding information about the coding units having a tree structure, and the information extractor 93 of the video decoding apparatus 90 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or the width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
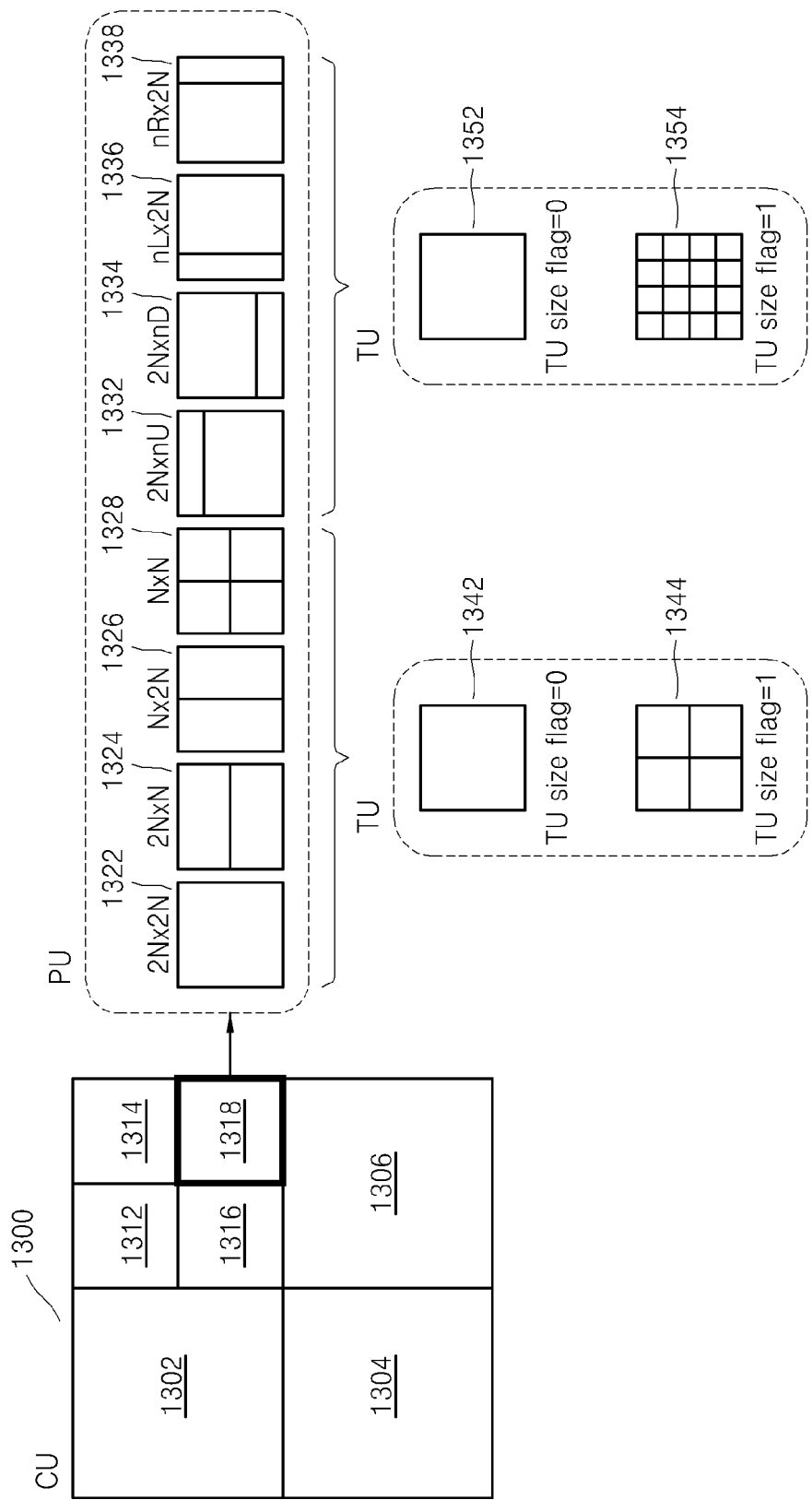
FIG. 20 is a diagram for describing a relationship between a coding unit, a prediction unit or a partition, and a transformation unit, according to encoding mode information of Table 2.

FIG. 20 is a diagram for describing a relationship between a coding unit, a prediction unit or a partition, and a transformation unit, according to encoding mode information of Table 2.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of transformation index, wherein a size of a transformation unit corresponding to a transformation index may change according to a prediction unit type or a partition type of a coding unit.

For example, when the partition type is set to be symmetrical, i.e., the partition type 1322, 1324, 1326, or 1328, a transformation unit 1342 having a size of 2N×2N is set if TU size flag is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 18, the TU size flag is a flag having a value or 0 or 1, but the TU size flag is not limited to 1 bit, and a transformation unit may be hierarchically split having a tree structure while the TU size flag increases from 0.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 80 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 90 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (10):

$$CurrMinTuSize=\max(MinTransformSize,RootTuSize/(2^{\wedge}MaxTransformSizeIndex)) \qquad (10).$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (10), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (11) below. In Equation (11), 'MaxTransformSize' denotes a maximum transformation unit size, and 'PUSize' denotes a current prediction unit size.

$$RootTuSize=\min(MaxTransformSize,PUSize) \qquad (11).$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (12) below. In Equation (12), 'PartitionSize' denotes the size of the current partition unit.

$$RootTuSize=\min(MaxTransformSize,PartitionSize) \qquad (12).$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

Figure 21:
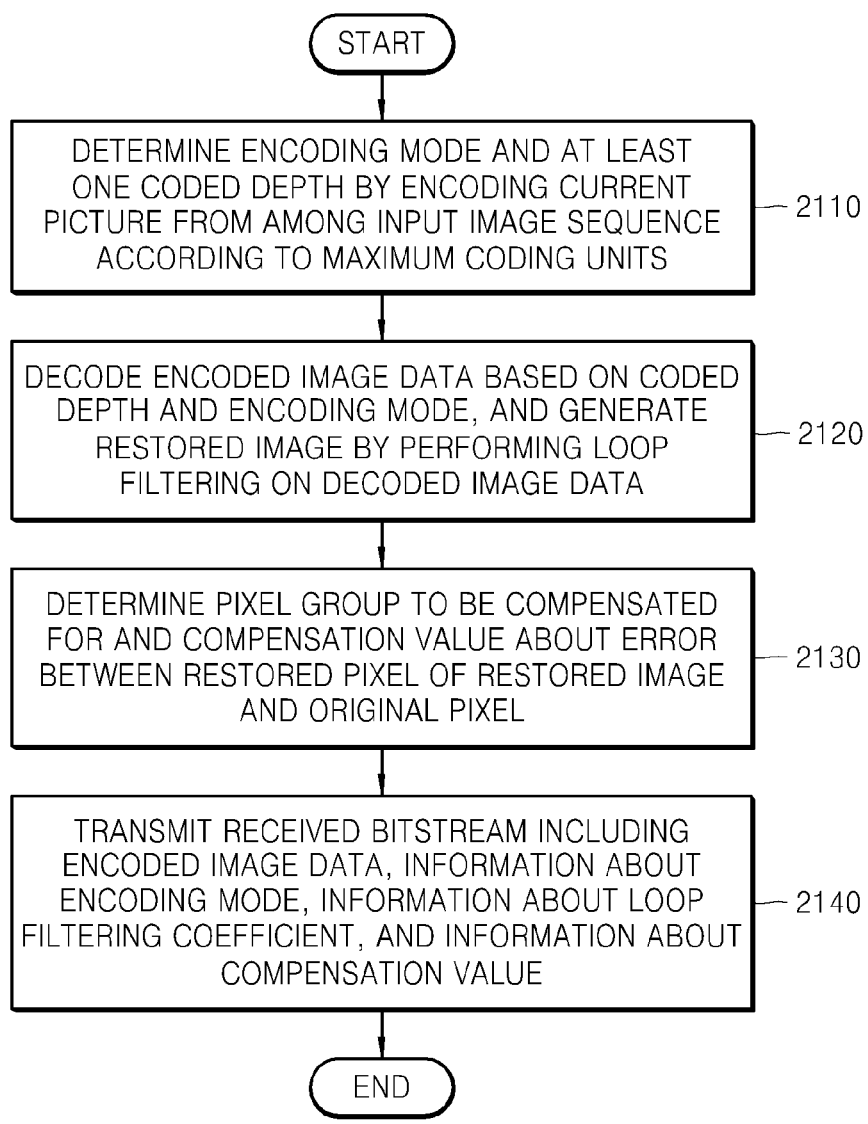
FIG. 21 is a flowchart illustrating a method of encoding a video by compensating for a pixel value after performing loop filtering based on coding units having a tree structure, according to an exemplary embodiment.

FIG. 21 is a flowchart illustrating a method of encoding a video for compensating for a pixel value after performing loop filtering based on coding units having a tree structure, according to an exemplary embodiment.

In operation 2110, a current picture is split into at least one maximum coding unit, and a coded depth to output a final encoding result according to at least one split region, which is obtained by splitting a region of each maximum coding unit according to depths, is determined by encoding the at least one split region. Also, an encoding mode including information about a coded depth or split information, information about a partition type of a coded depth, a prediction mode, and a size of a transformation unit, is determined according to a deeper coding unit according to depths.

A maximum depth indicating a total number of possible times the maximum coding unit is split may be predetermined. The maximum coding unit may be hierarchically split, and encoding may be repeatedly performed for each deeper coding unit whenever the depth deepens. Encoding errors of all deeper coding units are measured and compared so as to determine a coded depth that generates the least encoding error of the coding unit.

In operation 2120, encoded image data is decoded based on the coded depth and the encoding mode, and a restored image is generated by performing loop filtering on the decoded image data. The restored image may be generated by performing adaptive loop filtering, which continuously performs at least one one-dimensional filtering on the decoded image data or deblocked image data.

In operation 2130, a compensation value about an error between each restored pixel in a predetermined group of the restored image and an original pixel, and a pixel group including restored pixels to be compensated for are determined. The pixel group including the restored pixels having pixel values to be compensated for may be determined according to extreme and/or edge value levels of pixel values, bands of pixel values, or lines. The compensation value according to pixel groups may be determined based on an average value of the errors.

In operation 2140, image data constituting the final encoding result according to the at least one split region, information about the coded depth and the encoding mode, information about a loop filtering coefficient, and information related to the compensation value are output. The information about the encoding mode may include information about a coded depth or split information, information about a partition type of the coded depth, a prediction mode, and a size of a transformation unit.

The information related to the compensation value according to the pixel groups may be encoded along with the information about the encoding mode, the video data, and the information about the loop filtering coefficient, which are encoded according to the method based on the coding units having the tree structure, and may be transmitted to a decoder.

Figure 22:
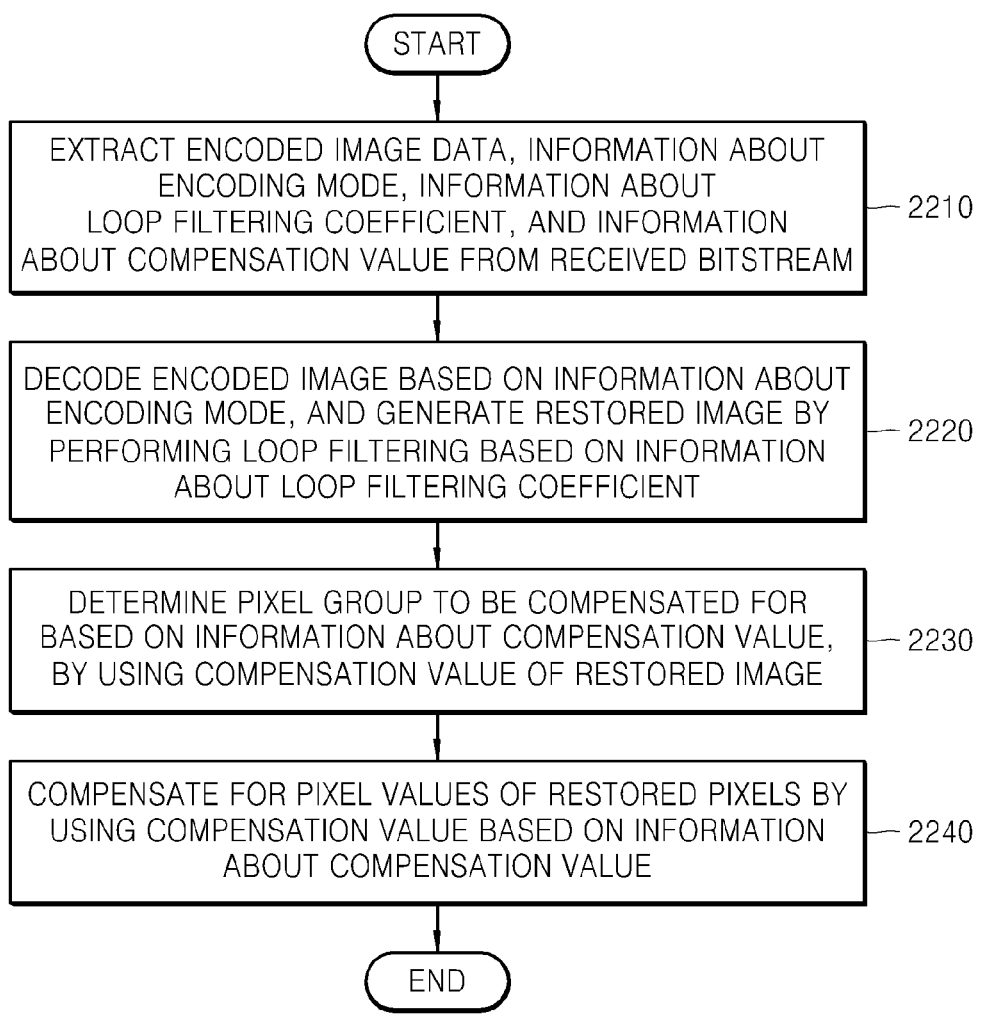
FIG. 22 is a flowchart illustrating a method of decoding a video by compensating for a pixel value after performing loop filtering based on coding units having a tree structure, according to an exemplary embodiment.

FIG. 22 is a flowchart illustrating a method of decoding a video for compensating for a pixel value after performing loop filtering based on coding units having a tree structure, according to an exemplary embodiment.

In operation 2210, a bitstream about a video encoded according to the method of FIG. 21 based on the coding units having the tree structure is received and parsed, and image data of a current picture assigned to a maximum coding unit, information about a coded depth and an encoding mode according to the maximum coding units, information about a loop filtering coefficient, and information related to a compensation value are extracted from the parsed bitstream.

A coded depth according to the maximum coding units is selected as a depth having the least encoding error according to maximum coding units while encoding the current picture. Encoding is performed according to the maximum coding units by encoding the image data based on at least one data unit obtained by hierarchically splitting the maximum coding unit according to depths. Accordingly, each piece of image data is decoded after determining the coded depth according to coding units, thereby improving encoding and decoding efficiency of an image.

In operation 2220, the image data is decoded in each maximum coding unit based on the information about the coded depth and the encoding mode, and a restored image is generated by performing loop filtering on the decoded image data. The restored image may be generated by performing adaptive loop filtering, wherein at least one one-dimensional filtering is continuously performed, on the decoded image data or deblocked image data.

In operation 2230, a pixel group including restored pixels to be compensated for is determined from among restored pixels of the restored image, by using the compensation value. The pixel group including the restored pixels having pixel values to be compensated for may be determined by using the compensation value, according to extreme and/or edge value levels of the pixel values of the restored pixels, bands of pixel values, or lines, by using a method of determining a pixel group based on the extracted information related to the compensation value.

In operation 2240, a restored image having a compensated error may be output by compensating an error between the restored pixels of the determined pixel group and corresponding original pixel by using the compensation value.

According to the method of encoding a video and the method of decoding a video, the quality of the restored image may be improved by compensating for a systematic error of the restored image, and a transmission bit rate of additional information for improving the quality of the restored image may be reduced since only the information about the compensation value according to the pixel groups is encoded and transmitted, and information about a location of a pixel to be compensated for is not transmitted.

Exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description of exemplary embodiments but by the appended claims, and all differences within the scope will be construed as being included in the present inventive concept.

What is claimed is:

1. An apparatus for video decoding, the apparatus comprising:
    a processor configured to apply an offset, among a plurality of offsets, to a pixel among pixels of a current block,
    wherein when a pixel value compensation type for the current block is a first type, the offset to be applied to the pixel, among the plurality of offsets, is determined corresponding to a band including the pixel, and
    when the pixel value compensation type is a second type, the offset to be applied to the pixel, among the plurality of offsets, is determined corresponding to an edge value level of the pixel.

2. The apparatus of claim 1, wherein the edge value level is determined by comparing the pixel and neighboring pixels of the pixel.

3. The apparatus of claim 1, wherein the band is one among bands corresponding to a range of sample values of the pixels.

* * * * *